(12) United States Patent
Pacala et al.

(10) Patent No.: US 10,063,849 B2
(45) Date of Patent: Aug. 28, 2018

(54) OPTICAL SYSTEM FOR COLLECTING DISTANCE INFORMATION WITHIN A FIELD

(71) Applicant: Ouster, Inc., San Francisco, CA (US)

(72) Inventors: Angus Pacala, San Francisco, CA (US); Mark Frichtl, San Francisco, CA (US)

(73) Assignee: Ouster, Inc., San Francisco, CA (US)

( * ) Notice: Subject to any disclaimer, the term of this patent is extended or adjusted under 35 U.S.C. 154(b) by 0 days.

(21) Appl. No.: 15/861,330

(22) Filed: Jan. 3, 2018

(65) Prior Publication Data
US 2018/0167602 A1 Jun. 14, 2018

Related U.S. Application Data

(63) Continuation-in-part of application No. 15/276,532, filed on Sep. 26, 2016, now Pat. No. 9,992,477.
(Continued)

(51) Int. Cl.
*G02B 27/22* (2018.01)
*G02B 3/00* (2006.01)
(Continued)

(52) U.S. Cl.
CPC ......... *H04N 13/218* (2018.05); *G02B 3/0056* (2013.01); *G02B 5/005* (2013.01);
(Continued)

(58) Field of Classification Search
CPC ........... H04N 13/0217; H04N 13/0207; H04N 13/0203; H04N 13/0495; H04N 13/0488;
(Continued)

(56) References Cited

U.S. PATENT DOCUMENTS 4,358,851 A 11/1982 Scifres et al.
4,634,272 A 1/1987 Endo
(Continued)

FOREIGN PATENT DOCUMENTS

EP 2124069 A1 11/2009
EP 3002548 A1 9/2016
(Continued)

OTHER PUBLICATIONS

PCTUS2017039306 "International Search Report and Written Opinion" dated Nov. 7, 2017 21 pages.
(Continued)

*Primary Examiner* — John Lee
(74) *Attorney, Agent, or Firm* — Kilpatrick Townsend & Stockton LLP

(57) ABSTRACT

An optical system for collecting distance information within a field is provided. The optical system may include lenses for collecting photons from a field and may include lenses for distributing photons to a field. The optical system may include lenses that collimate photons passed by an aperture, optical filters that reject normally incident light outside of the operating wavelength, and pixels that detect incident photons. The optical system may further include illumination sources that output photons at an operating wavelength.

20 Claims, 11 Drawing Sheets

Related U.S. Application Data

(60) Provisional application No. 62/232,222, filed on Sep. 24, 2015.

(51) Int. Cl.
| | | |
|---|---|---|
| *G02B 5/00* | (2006.01) | |
| *G02B 5/20* | (2006.01) | |
| *H04N 13/218* | (2018.01) | |
| *H04N 13/02* | (2006.01) | |
| *H04N 13/04* | (2006.01) | |
| *G02B 27/42* | (2006.01) | |
| *H04N 13/395* | (2018.01) | |

(52) U.S. Cl.
CPC ......... *G02B 5/208* (2013.01); *G02B 27/2214* (2013.01); *G02B 27/42* (2013.01); *H04N 13/0217* (2013.01); *H04N 13/0495* (2013.01); *H04N 13/395* (2018.05)

(58) Field of Classification Search
CPC .. G02B 3/0056; G02B 3/0037; G02B 3/0006; G02B 5/005; G02B 5/208; G02B 5/20; G02B 27/2214; G02B 27/22; G02B 6/002; G01J 1/08; G01J 1/02; G01J 1/0266; G01J 1/029
See application file for complete search history.

(56) References Cited

U.S. PATENT DOCUMENTS

| | | |
|---|---|---|
| 4,676,599 A | 6/1987 | Cruz |
| 4,702,600 A | 10/1987 | Handrich et al. |
| 4,744,667 A | 5/1988 | Fay et al. |
| 4,851,664 A | 7/1989 | Rieger |
| 5,267,016 A | 11/1993 | Meinzer et al. |
| 5,288,992 A | 2/1994 | Fohl |
| 6,014,232 A | 1/2000 | Clarke |
| 6,133,989 A | 10/2000 | Stettner et al. |
| 6,255,133 B1 | 7/2001 | Ormond et al. |
| 6,374,024 B1 | 4/2002 | Iijima |
| 6,414,746 B1 | 7/2002 | Stettner et al. |
| 6,690,019 B2 | 2/2004 | Stettner et al. |
| 6,721,262 B1 | 4/2004 | Jordache et al. |
| 7,091,462 B2 | 8/2006 | Wilson et al. |
| D531,525 S | 11/2006 | Dold et al. |
| 7,170,542 B2 | 1/2007 | Hanina et al. |
| 7,295,298 B2 | 11/2007 | Willhoeft et al. |
| 7,345,271 B2 | 3/2008 | Boehlau et al. |
| 7,421,159 B2 | 9/2008 | Yang et al. |
| 7,433,042 B1 | 10/2008 | Cavanaugh et al. |
| 7,808,706 B2 | 10/2010 | Fadel et al. |
| 7,969,558 B2 | 6/2011 | Hall |
| 8,013,983 B2 | 9/2011 | Lin et al. |
| 8,130,367 B2 | 3/2012 | Stettner et al. |
| D659,030 S | 5/2012 | Anselment et al. |
| 8,319,949 B2 | 11/2012 | Cantin et al. |
| 8,089,618 B2 | 12/2012 | Yang |
| 8,330,840 B2 | 12/2012 | Lenchenkov |
| 8,374,405 B2 | 2/2013 | Lee et al. |
| 8,384,997 B2 | 2/2013 | Shpunt et al. |
| 8,494,252 B2 | 7/2013 | Freedman et al. |
| 8,675,181 B2 | 3/2014 | Hall |
| 8,717,488 B2 | 5/2014 | Shpunt et al. |
| 8,742,325 B1 | 6/2014 | Droz et al. |
| 8,743,176 B2 | 6/2014 | Stettner et al. |
| 8,761,495 B2 | 6/2014 | Freedman et al. |
| 8,767,190 B2 | 7/2014 | Hall |
| 8,829,406 B2 | 9/2014 | Akerman et al. |
| 8,836,922 B1 | 9/2014 | Pennecot et al. |
| 8,848,039 B2 | 9/2014 | Spektor et al. |
| 9,041,915 B2 | 5/2015 | Earnhart et al. |
| 9,063,549 B1 | 6/2015 | Pennecot et al. |
| 9,071,763 B1 | 6/2015 | Templeton et al. |
| 9,086,273 B1 | 7/2015 | Gruver et al. |
| 9,111,444 B2 | 8/2015 | Kaganovich |
| 9,157,790 B2 | 10/2015 | Shpunt et al. |
| 9,164,511 B1 | 10/2015 | Ferguson et al. |
| 9,176,051 B2 | 11/2015 | Mappes et al. |
| 9,229,109 B2 | 1/2016 | Stettner et al. |
| 9,285,464 B2 | 3/2016 | Pennecot et al. |
| 9,299,731 B1 | 3/2016 | Lenius et al. |
| 9,368,936 B1 | 6/2016 | Lenius et al. |
| 9,369,689 B1 | 6/2016 | Tran et al. |
| 9,285,477 B1 | 7/2016 | Smith et al. |
| 9,383,753 B1 | 7/2016 | Templeton et al. |
| 9,425,654 B2 | 8/2016 | Lenius et al. |
| 9,435,891 B2 | 9/2016 | Oggier |
| 9,470,520 B2 | 10/2016 | Schwarz et al. |
| 9,489,601 B2 | 11/2016 | Fairfield et al. |
| 9,525,863 B2 | 12/2016 | Nawasra et al. |
| 9,529,079 B1 | 12/2016 | Droz et al. |
| 2003/0006676 A1 | 1/2003 | Smith et al. |
| 2003/0047752 A1 | 3/2003 | Campbell |
| 2004/0061502 A1 | 4/2004 | Hasser |
| 2004/0223071 A1 | 11/2004 | Wells |
| 2005/0030409 A1 | 2/2005 | Matherson |
| 2006/0244851 A1 | 11/2006 | Cartlidge |
| 2007/0007563 A1 | 1/2007 | Mouli |
| 2007/0060806 A1 | 3/2007 | Hunter et al. |
| 2007/0228262 A1 | 10/2007 | Cantin et al. |
| 2008/0153189 A1 | 6/2008 | Plaine |
| 2009/0016642 A1 | 1/2009 | Hart et al. |
| 2009/0040629 A1 | 2/2009 | Bechtel |
| 2009/0179142 A1 | 7/2009 | Duparre et al. |
| 2009/0295910 A1 | 12/2009 | Mir |
| 2010/0008588 A1 | 1/2010 | Feldkhun et al. |
| 2010/0020306 A1 | 1/2010 | Hall |
| 2010/0110275 A1 | 5/2010 | Mathieu |
| 2010/0123893 A1 | 5/2010 | Yanq |
| 2010/0204964 A1 | 8/2010 | Pack et al. |
| 2011/0025843 A1 | 2/2011 | Oggier et al. |
| 2011/0032398 A1 | 2/2011 | Lenchenkov |
| 2011/0037849 A1 | 2/2011 | Niclass et al. |
| 2011/0116262 A1 | 5/2011 | Marson |
| 2011/0216304 A1 | 9/2011 | Hall |
| 2012/0044476 A1 | 2/2012 | Earnhart et al. |
| 2012/0140109 A1 | 6/2012 | Shpunt et al. |
| 2012/0154914 A1 | 6/2012 | Moriguchi et al. |
| 2012/0182464 A1 | 7/2012 | Shpunt et al. |
| 2012/0287417 A1 | 11/2012 | Mimeault |
| 2012/0320164 A1 | 12/2012 | Lipton |
| 2013/0044310 A1 | 2/2013 | Mimeault |
| 2013/0141549 A1 | 6/2013 | Beers et al. |
| 2013/0206967 A1 | 8/2013 | Shpunt et al. |
| 2013/0294089 A1 | 11/2013 | Freedman et al. |
| 2013/0300840 A1 | 11/2013 | Borowski |
| 2014/0118335 A1 | 5/2014 | Gurman |
| 2014/0118493 A1 | 5/2014 | Sali et al. |
| 2014/0153001 A1 | 6/2014 | Chayat et al. |
| 2014/0158900 A1 | 6/2014 | Yoon et al. |
| 2014/0168631 A1 | 6/2014 | Haslim et al. |
| 2014/0176933 A1 | 6/2014 | Haslim et al. |
| 2014/0211194 A1 | 7/2014 | Pacala et al. |
| 2014/0269796 A1 | 9/2014 | Geske |
| 2014/0285628 A1 | 9/2014 | Shpunt et al. |
| 2014/0291491 A1 | 10/2014 | Shpunt et al. |
| 2014/0313519 A1 | 10/2014 | Shpunt et al. |
| 2014/0375977 A1 | 12/2014 | Ludwig et al. |
| 2014/0376092 A1 | 12/2014 | Mor |
| 2015/0002636 A1 | 1/2015 | Brown |
| 2015/0131080 A1 | 5/2015 | Retterath et al. |
| 2015/0184999 A1 | 7/2015 | Stettner |
| 2015/0192677 A1 | 7/2015 | Yu et al. |
| 2015/0292948 A1 | 10/2015 | Goldring et al. |
| 2015/0293224 A1 | 10/2015 | Eldada |
| 2015/0316473 A1 | 11/2015 | Kester et al. |
| 2015/0355470 A1 | 12/2015 | Herschbach |
| 2015/0358601 A1 | 12/2015 | Oggier |
| 2015/0378241 A1 | 12/2015 | Eldada |
| 2015/0379371 A1 | 12/2015 | Yoon et al. |
| 2016/0003946 A1 | 1/2016 | Gilliland et al. |
| 2016/0047895 A1 | 2/2016 | Dussan |
| 2016/0047896 A1 | 2/2016 | Dussan |

(56) References Cited

U.S. PATENT DOCUMENTS

| | | | |
|---|---|---|---|
| 2016/0047897 A1 | 2/2016 | Dussan | |
| 2016/0047898 A1 | 2/2016 | Dussan | |
| 2016/0047899 A1 | 2/2016 | Dussan | |
| 2016/0047900 A1 | 2/2016 | Dussan | |
| 2016/0047901 A1 | 2/2016 | Pacala et al. | |
| 2016/0047903 A1 | 2/2016 | Dussan | |
| 2016/0049765 A1 | 2/2016 | Eldada | |
| 2016/0097858 A1 | 4/2016 | Mundhenk et al. | |
| 2016/0150963 A1 | 6/2016 | Roukes et al. | |
| 2016/0161600 A1 | 6/2016 | Eldada et al. | |
| 2016/0218727 A1 | 7/2016 | Maki | |
| 2016/0265902 A1 | 9/2016 | Nawasra et al. | |
| 2016/0291134 A1 | 10/2016 | Droz et al. | |
| 2016/0306032 A1 | 10/2016 | Schwarz et al. | |
| 2016/0327779 A1 | 11/2016 | Hillman | |
| 2016/0328619 A1 | 11/2016 | Yi et al. | |
| 2017/0146640 A1 | 5/2017 | Hall et al. | |
| 2017/0219426 A1 | 8/2017 | Pacala et al. | |
| 2017/0219695 A1 | 8/2017 | Hall et al. | |
| 2017/0269197 A1 | 9/2017 | Hall et al. | |
| 2017/0269198 A1 | 9/2017 | Hall et al. | |
| 2017/0269209 A1 | 9/2017 | Hall et al. | |
| 2017/0269215 A1 | 9/2017 | Hall et al. | |
| 2017/0289524 A1 | 10/2017 | Pacala et al. | |
| 2017/0299700 A1* | 10/2017 | Pacala | G01S 7/4817 |
| 2017/0350983 A1 | 12/2017 | Hall et al. | |
| 2018/0059222 A1* | 3/2018 | Pacala | G01S 7/4816 |

FOREIGN PATENT DOCUMENTS

| | | |
|---|---|---|
| JP | H3-6407 | 1/1991 |
| JP | 07-049417 | 2/1995 |
| WO | 2015052616 A1 | 4/2015 |
| WO | 2016116733 A1 | 7/2016 |
| WO | 2016125165 A1 | 8/2016 |
| WO | 2017132704 | 8/2017 |

OTHER PUBLICATIONS

PCTUS2017039306 "Invitation to Pay Add'l Fees and Partial Search Report" dated Aug. 31, 2017 2 pages.
Velodyne Lidar, Inc., HDL-32E Data Sheet 2010, 2017.
Velodyne Lidar, Inc., HDL-32E, User's Manual 2010.; Aug. 2016.
Velodyne Lidar, Inc., HDL-32E, HDL-32E, webpage: http://www.velodynelidar.com/hdl-32e.html; retrieved Dec. 6, 2017.
Velodyne Lidar, Inc., HDL-64E Data Sheet, 2017.
Velodyne Lidar, Inc., HDL-64E S2 and S2.1; User's Manual and Programming Guide 2007; Firmware version 4; 2007, revision Nov. 2012.
Velodyne Lidar, Inc., HDL-64E, S3; User's Manual and Programming Guide revision J; 2007.; Dec. 2017.
Velodyne Lidar, Inc., HDL-64E; webpage: http://www.velodynelidar.com/hdl-64e.html; retrieved Dec. 6, 2017.
Velodyne Lidar, Inc., VLP-16 data sheet, Puck, Real Time 3D Lidar Sensor, 2014.
Velodyne Lidar, Inc., Velodyne Lidar Puck; User's Manual and Programming Guide; 2014.
Velodyne Lidar, Inc., VLP-16; retrieved via website: http://www.velodynelidar.com/vlp-16.html; Dec. 6, 2017.
Velodyne Lidar, Inc.; Puck Hi-Res Data Sheet; Sep. 2016.
Velodyne Lidar, Inc.; Puck Hi-Res User Manual; Sep. 2016.
Velodyne Lidar, Inc.; Puck Hi-Res retrieved via website: http://www.velodynelidar.com/vlp-16-hi-res.html; Dec. 13, 2017.
Velodyne Lidar, Inc.; Puck Lite Data Sheet; Feb. 2016.
Velodyne Lidar, Inc.; Puck Lite User Manual; Feb. 2016.
Velodyne Lidar, Inc.; Puck Lite, Our Lightest Sensor Ever, Apr. 2016; retrieved via website: http://www.velodynelidar.com/vlp-16-lite-html; Dec. 13, 2017.
Velodyne Lidar, Inc.; Ultra Puck VLP-32C; Nov. 2017; retrieved via website: http://www.velodynelidar.com/vlp-32c.html; Dec. 13, 2017.
PCTUS2017048379 "International Search Report and Written Opinion" dated Nov. 2, 2017, 15 pages.
Non-Final Office Action dated Jul. 28, 2017 in U.S. Appl. No. 15/419,053, filed Jan. 30, 2017, 26 pages.
Bronzi, Danilo, "100 000 Frames/s 64×32 Single Photon Detector Array for 2-D Imaging and 3-D Ranging", IEEE Journal of Selected Topic in Quantum Electronics, vol. 20, No. 6, Nov./Dec. 2014; 10 pages.
Quanergy Systems EX, 1005, Review of Scientific Instruments; vol. 72, No. 4, Apr. 2001, 13 pages.
Itzler, Mark A., "Geiger-mode avalance photodiode focal plane arrays for three-dimensional imaging LADAR"; Princeton LLghtwave, Inc., Proc of SPIE vol. 7808 780890C-, 14 pages.
Cova, Sergio D.; Single-Photon Counting Detectors, IEEE Photonics Journal; vol. 3, No. 2, Apr. 2011, 5 pages.
Guerrieri, Fabrizio, Two-Dimensional Spad Imaging Camera for Photon Counting, vol. 2, No. 5, Oct. 2010, 17 pages.
Charbon, Edoardo, et al. "SPAD-Based Sensors"; TOF Range-Imaging Cameras, Remondino, F. ; Stoppa, D. (Eds.), 2013, V, 240 p. 138 Illus., 85 illus. in color., Hardcover ISBN: 978-3-642-27522-7.

\* cited by examiner

OPTICAL SYSTEM FOR COLLECTING DISTANCE INFORMATION WITHIN A FIELD

CROSS-REFERENCE TO RELATED APPLICATIONS

This application is a continuation-in-part of U.S. Nonprovisional patent application Ser. No. 15/276,532, filed on Sep. 26, 2016, which claims the benefit of U.S. Provisional Patent Application No. 62/232,222 filed Sep. 24, 2015. The disclosures of each of the '532 and '222 above-referenced applications are hereby incorporated by reference in their entirety for all purposes.

FIELD OF THE INVENTION

This invention relates generally to the field of optical sensors and more specifically to a new and useful optical system for collecting distance information in the field of optical sensors.

BACKGROUND OF THE INVENTION

Light imaging, detection and ranging (LIDAR) systems measure distance to a target by illuminating the target with a pulsed laser light and measuring the reflected pulses with a sensor. Time-of-flight measurements can then be used to make a digital 3D-representation of the target. LIDAR systems can be used for a variety of applications where 3D depth images are useful including archaeology, geography, geology, forestry, mapping, construction, medical imaging and military applications, among others. Autonomous vehicles can also use LIDAR for obstacle detection and avoidance as well as vehicle navigation.

Many currently available LIDAR sensors that provide coverage and resolution sufficient for obstacle detection and avoidance in autonomous vehicles are both technologically complex and costly to manufacture. Such sensors are thus too expensive to allow for wide deployment in mass-market automobiles, trucks and other vehicles. For example, one commercially available LIDAR sensor is the HDL-64E manufactured by Velodyne (see http://www.velodynelidar.com/hdl-64e.html). The HDL-64E LIDAR sensor is designed for obstacle detection and navigation of autonomous vehicles, such as ground vehicles and marine vessels. It includes sixty-four (64) pairs of lasers and photodiodes to scan and generate a relatively high level of detail of the surrounding environment. The HDL-64E LIDAR sensor is too expensive, however, to be commercially feasible as a sensor for mass market autonomous cars.

Velodyne also manufactures other less expensive LIDAR sensors including the HDL-32E (see http://www.velodynelidar.com/hdl-32e.html). In order to reduce the cost of the sensor Velodyne included thirty-two (32) pairs of laser emitters and photo diode detectors in the HDL-32E instead of sixty-four (64) pairs included in the HDL-64E. With fewer pairs of lasers and photodiodes, the HDL-32E sensor provides a lower resolution view of the surrounding environment than the HDL-64E sensor. Despite including fewer laser/photo diode pairs, however, the Velodyne HDL-32E sensor is still too expensive to be adopted for use in mass-market automobiles.

The fundamental technology behind the HDL-64E LIDAR sensor and the HDL-32E LIDAR sensor is covered by U.S. Pat. No. 7,969,558 ("the '558 patent") assigned to Velodyne. FIG. 12 of the present application is a reproduction of FIG. 13 of the '558 patent (annotated with new reference numbers), which in turn, provides a general representation of what became the HDL-64E sensor. As shown in FIG. 12, the '558 patent discloses a LIDAR sensor 250 that includes an upper housing 252 supported by a base 258. The upper housing 252 includes sixty-four (64) emitter/detector pairs mounted in two separate assemblies 254 and 256.

As shown in FIG. 13 of the present application, which is cross-sectional view of FIG. 12 and a reproduction of FIG. 14 from the '558 patent, assemblies 254 and 256 are positioned within upper housing 252 at different angles relative to the horizontal to provide different vertical fields of view. Base 258 includes a magnetic motor 259 and a stator 260 and is connected to a rotary coupling 261 that allows motor 259 to rotate the base 258, and with it upper housing 252, enabling assemblies 254 and 256 to capture a full 360 degree horizontal field of view.

Velodyne filed a second patent application on its LIDAR technology that issued as U.S. Pat. No. 8,767,190 ("the '190 patent"). The '190 patent specifically states that it includes several improvements on the technology described in the '558 patent and that the technology disclosed in the '190 patent is incorporated into the HDL-32E LIDAR sensor. FIGS. 14 and 15 of the present application are reproductions of FIGS. 9 and 8, respectively, of the '190 patent (annotated with new reference numbers). As shown in FIGS. 14 and 15, the '190 patent discloses a LIDAR sensor 300 that, like sensor 250 set forth in the '558 patent, includes an upper housing supported by a base 380 along with a rotary component. The upper housing includes thirty-two (32) separate emitter boards 330 and thirty-two separate detector boards 332 mounted to a vertically oriented motherboard 320. The upper housing also includes first and second mirrors 340, 342 that, along with the motherboard 320, are mounted to a common frame 322, and lenses 350 and 352 supported by a lens frame 354.

In operation, the rotary component rotates the upper housing to provide a 360 degree field of view while each emitter fires rearward into first mirror 340. Light reflects off mirror 340 through a hole 324 in motherboard 320 and then through lens 350 before the emitted light 360 travels out to a target 370. After being reflected off target 370, the returned light 362 passes through the detector lens 352 and through motherboard hole 324. The returned light then reflects off the second mirror 342 into the corresponding detector.

The technology described in the '558 and '190 patents (the "Velodyne patents") and incorporated into the HDL-64E and HDL-32E sensors manufactured by Velodyne has a number of important limitations that limit its ability to be incorporated into a LIDAR sensor that has sufficient resolution and range to be useable in autonomous vehicle applications at a price point and reliability that will enable the technology to be widely adopted in mass-market automobiles. From an overall design standpoint, the architecture described in the Velodyne patents has a low degree of system integration and includes a rotary actuator that is a separate module not integrated into the LIDAR sensor. The lack of integration and the inclusion of a separate rotary actuator requires specialized mounts and interconnects that increase the complexity of the sensor and hence increase the cost.

Another problem with the Velodyne LIDAR sensors mentioned above and described in the above-referenced patents is that each of the emitter/detector pairs in the LIDAR sensors includes a laser diode emitter and an avalanche photo diode (APD) detector. APDs are analog devices that output an analog signal, e.g., a current that is proportional to the light intensity incident on the detector. APDs have high dynamic range as a result but need to be backed by several additional analog circuits, such as a transconductance or transimpedance amplifier, a variable gain or differential amplifier, a high-speed A/D converter, one or more digital signal processors (DSPs) and the like. Traditional APDs also require high reverse bias voltages not possible with standard CMOS processes that typically must be generated by a separate discrete high voltage power supply. Without analogous mature CMOS technology available, it is difficult to integrate all this analog circuitry onto a single chip with a compact form factor. Instead, Velodyne uses multiple external circuit modules located on separate printed circuit boards, which contributes to the high cost of these existing units.

Additionally, due to the required number of physically and electrically separate components associated with each APD detector, Velodyne mounts the separate laser emitter/detector pairs to individual, separate circuit boards. As an example, the Velodyne HDL-64E includes sixty-four emitter/detector pairs and thus includes sixty-four separate emitter boards and sixty-four separate receiver boards. Each such emitter board and receiver board is separately mounted to a motherboard with each emitter/detector pair precisely aligned along a particular direction to ensure that the field of view of every detector overlaps with the field of view of the detector's respective emitter. As a result of this architecture, precision alignment techniques may be required during assembly to align each emitter board and each receiver board separately. The individual, separate circuit boards associated with the APD detectors and laser diode emitters also limit the extent to which the Velodyne LIDAR sensors can be made compact.

This architecture becomes increasingly problematic when one desires to scale the resolution of the device because increasing the resolution requires the addition of more laser emitter/detector pairs, with each mounted on their own circuit board. Consequently, scaling the resolution linearly with this type of architecture can lead to exponential increases in manufacturing costs and also exponential reductions in reliability due to the sheer number of individual parts and boards involved. For example, even if the yield of each individual APD is 99.5% reliability per emitter/APD pair, a device with 32 pairs will be 85% reliable, a device with 64 pairs will be 72.5% reliable and a device with 128 pairs will be 52.6% reliable. Then, once assembly and alignment is complete, great care must be taken to ensure that the precisely aligned multi-board arrangement is not disturbed or jolted out of alignment during shipping or at some other point over the design life of the system. Reliability has been a notable problem for Velodyne sensors.

The Velodyne architecture is also designed so that it preferably employs a time multiplexing scheme that activates only one or a small subset of emitter-detector pairs at any given time. Such an arrangement requires additional timing electronics and multiplexing software and hardware which adds cost and complexity to the system. Time-multiplexing in such a manner can also increase the time between measuring a same 3D position and can potentially fail to adequately identify and warn of fast moving objects.

SUMMARY OF THE INVENTION

Embodiments of the invention pertain to a LIDAR sensor that can, among other uses, be used for obstacle detection and avoidance in autonomous vehicles. Some specific embodiments pertain to LIDAR sensors that include design features that enable the sensors to be manufactured cheaply enough and with sufficient reliability and to have a small enough footprint to be adopted for use in mass-market automobiles, trucks and other vehicles. For example, some embodiments include a set of vertical-cavity surface-emitting lasers (VCSELs) as illumination sources that emit radiation into a field and include arrays of single-photon avalanche diode (SPAD) detectors as a set of pixels (detectors) that detect radiation reflected back from a surface in the field. Using VCSELs as the emitters and SPADs as the detectors enables multiple measurements to be taken at the same time (i.e., the VCSEL emitters can be fired simultaneously) and also enables the set of emitters and the set of pixels to each be fabricated using standard CMOS processes on a single chip, greatly simplifying the manufacturing and assembly process.

Using VCSELs and SPADs in certain embodiments presents challenges, however, that various embodiments of the invention overcome. For example, VCSELs are much less powerful than the lasers used in the Velodyne architecture and SPADs are much less efficient than the detectors used in the Velodyne architecture. To address these challenges, as well as challenges presented by firing multiple emitters simultaneously, certain embodiments of the disclosure include various optical components (e.g., lenses, filters, and an aperture layer), which may work in concert with multiple arrays of SPADs, each array corresponding to a different pixel, as described herein.

DETAILED DESCRIPTION OF THE PREFERRED EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. One-Dimensional Optical System: Aperture Array

Figure 1:
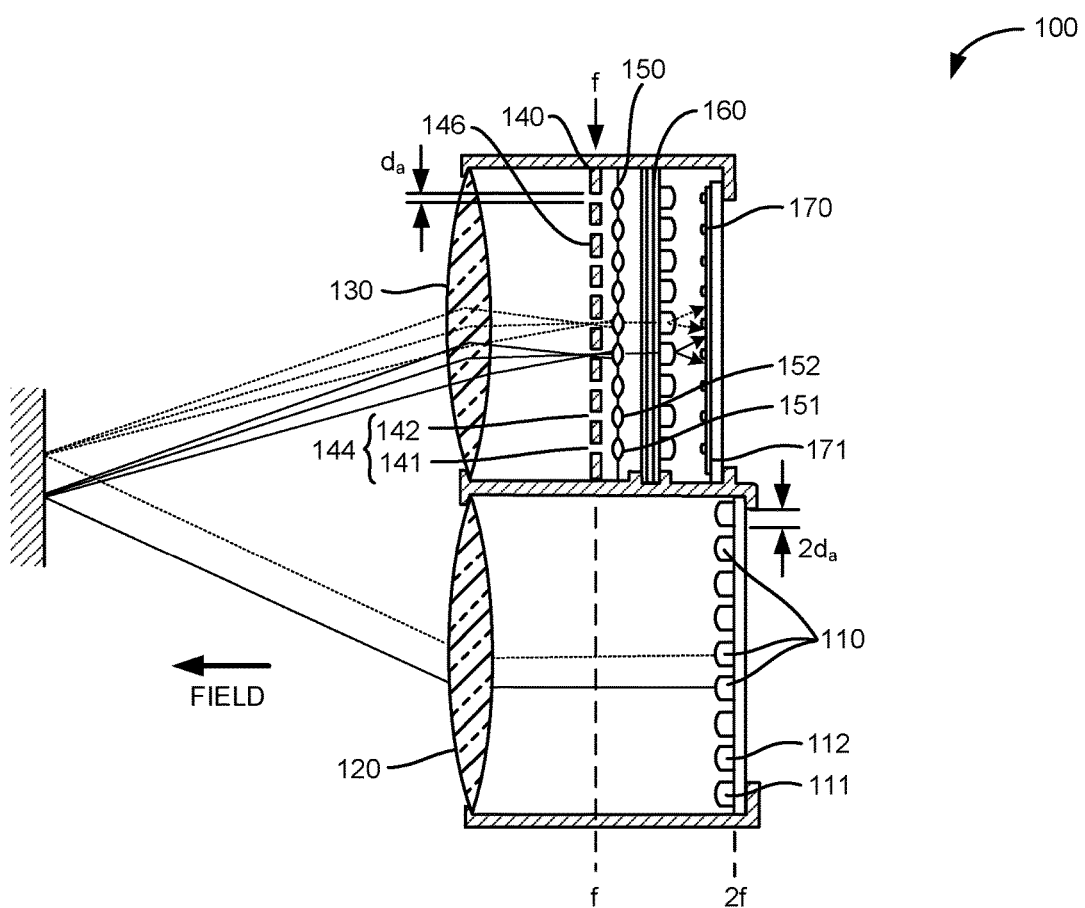
FIG. 1 is a schematic representation of a system.

As shown in FIG. 1, a one-dimensional optical system 100 for collecting distance information within a field includes: a set of illumination sources 110 arranged along a first axis, each illumination source in the set of illumination sources 110 configured to output an illuminating beam of an operating wavelength toward a discrete spot in the field ahead of the illumination source; a bulk imaging optic 130 characterized by a focal plane opposite the field; an aperture layer 140 coincident the focal plane, defining a set of apertures 144 in a line array parallel to the first axis, and defining a stop region 146 around the set of apertures 144, each aperture in the set of apertures 144 defining a field of view in the field coincident a discrete spot output by a corresponding illumination source in the set of illumination sources 110, the stop region 146 absorbing light rays reflected from surfaces in the field outside of fields of view defined by the set of apertures 144 and passing through the bulk imaging optic 130; a set of lenses 150, each lens in the set of lenses 150 characterized by a second focal length, offset from the focal plane opposite the bulk imaging optic 130 by the second focal length, aligned with an aperture in the set of apertures 144, and configured to collimate light rays passed by the aperture; an optical filter 160 adjacent the set of lenses 150 opposite the aperture layer 140 and configured to pass light rays at the operating wavelength; a set of pixels 170 adjacent the optical filter 160 opposite the set of lenses 150, each pixel in the set of pixels 170 corresponding to a lens in the set of lenses 150 and including a set of subpixels arranged along a second axis non-parallel to the first axis; and a diffuser 180 interposed between the optical filter 160 and the set of pixels 170 and configured to spread collimated light output from each lens in the set of lenses 150 across a set of subpixels of a corresponding pixel in the set of pixels 170.

1.1 Applications

Generally, the one-dimensional optical system 100 (the "system") functions as an image sensor that, when rotated about an axis parallel to a column of apertures, collects three-dimensional distance data of a volume occupied by the system. Specifically, the one-dimensional optical system 100 can scan a volume to collect three-dimensional distance data that can then be reconstructed into a virtual three-dimensional representation of the volume, such as based on recorded times between transmission of illuminating beams from the illumination sources and detection of photons—likely originating from the illumination sources—incident on the set of pixels 170, based on phase-based measurements techniques, or based on any other suitable distance measurement technique. The system 100 includes: a column of offset apertures arranged behind a bulk imaging optic 130 and defining discrete fields of view in a field ahead of the bulk imaging optic 130 (that is non-overlapping fields of view beyond a threshold distance from the system); a set of illumination sources 110 that project discrete illuminating beams at an operating wavelength into (and substantially only into) the fields of view defined by the apertures; a column of lenses that collimate light rays passed by corresponding apertures; and an optical filter 160 that selectively passes a narrow band of wavelengths of light (i.e., electromagnetic radiation) including the operating wavelength; and a set of pixels 170 that detect incident photons (e.g., count incident photons, tracks times between consecutive incident photons). The system can therefore selectively project illuminating beams into a field ahead of the system according to an illumination pattern that substantially matches—in size and geometry across a range of distances from the system—the fields of view of the apertures. In particular, the illumination sources are configured to illuminate substantially only surfaces in the field ahead of the system that can be detected by pixels in the system such that minimal power output by the system (via the illumination sources) is wasted by illuminating surfaces in the field for which the pixels are blind. The system can therefore achieve a relatively high ratio of output signal (i.e., illuminating beam power) to input signal (i.e., photons passed to an incident on the pixel array). Furthermore, the set of lenses 150 can collimate light rays passed by adjacent apertures such that light rays incident on the optical filter 160 meet the optical filter 160 at an angle of incidence of approximately 0°, thereby maintaining a relatively narrow band of wavelengths of light passed by the optical filter 160 and achieving a relatively high signal-to-noise ratio ("SNR") for light rays reaching the set of pixels 170.

The system includes pixels arranged in a column and aligned with the apertures, and each pixel can be non-square in geometry (e.g., short and wide) to extend the sensing area of the system for a fixed aperture pitch and pixel column height. The system also includes a diffuser 180 that spreads light rays passed from an aperture through the optical filter 160 across the area of a corresponding pixel such that the pixel can detect incident photons across its full width and height thereby increasing the dynamic range of the system.

The system is described herein as projecting electromagnetic radiation into a field and detecting electromagnetic radiation reflected from a surface in the field back to bulk receiver optic. Terms "illumination beam," "light," "light rays," and "photons" recited herein refer to such electromagnetic radiation. The term "channel" recited herein refers to one aperture in the aperture layer 140, a corresponding lens in the set of lenses 150, and a corresponding pixel in the set of pixels 170.

1.2 Bulk Imaging Optic

The system includes a bulk imaging optic 130 characterized by a focal plane opposite the field. Generally, the bulk imaging optic 130 functions to project incident light rays from outside the system toward the focal plane where light rays incident on a stop region 146 of the aperture layer 140 are rejected (e.g., mirrored or absorbed) and where light rays incident on apertures in the aperture layer 140 are passed into a lens characterized by a focal length and offset from the focal plane by the focal length.

Figure 11:
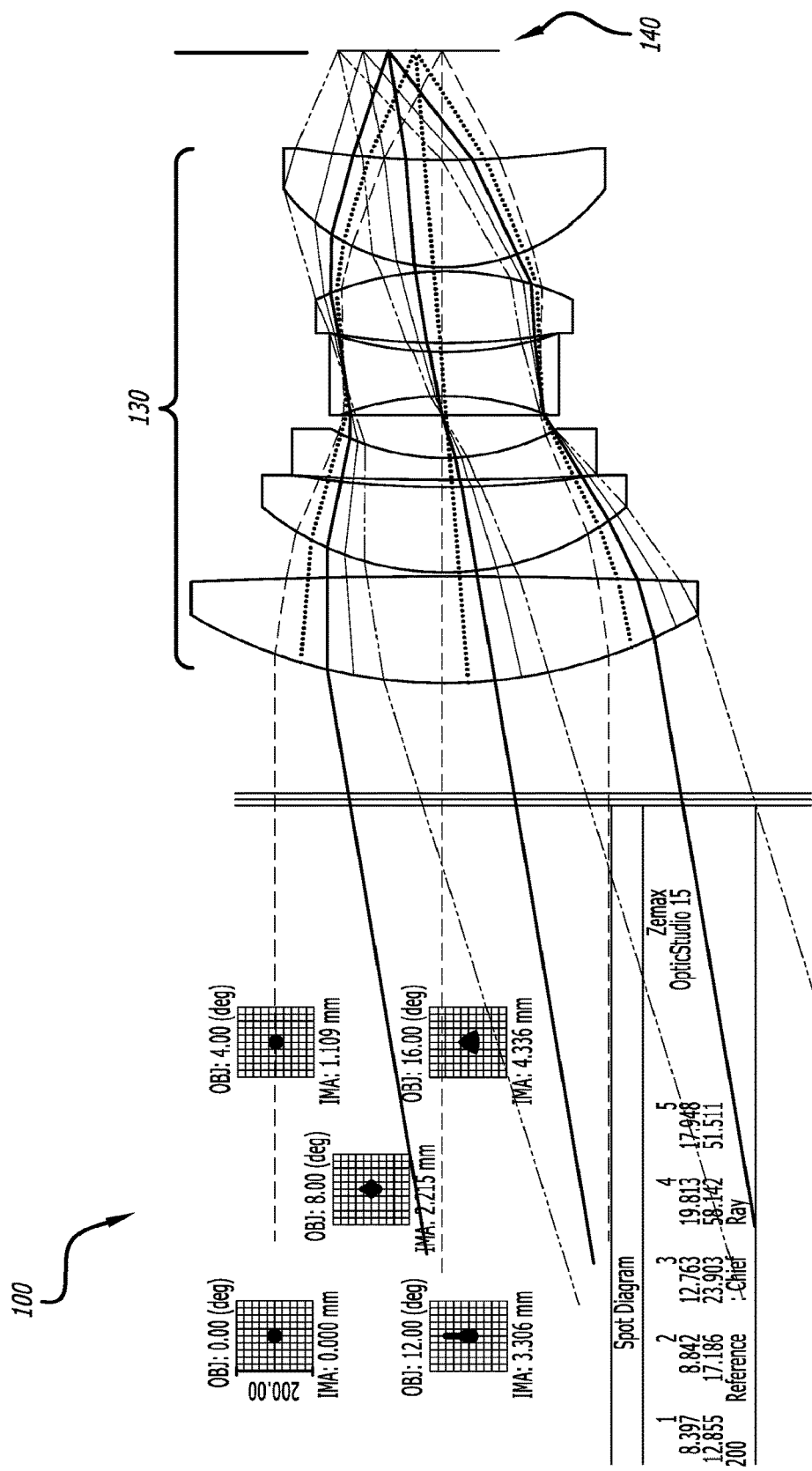
FIG. 11 is a schematic representation in accordance with one variation of the system.
Figure 12:
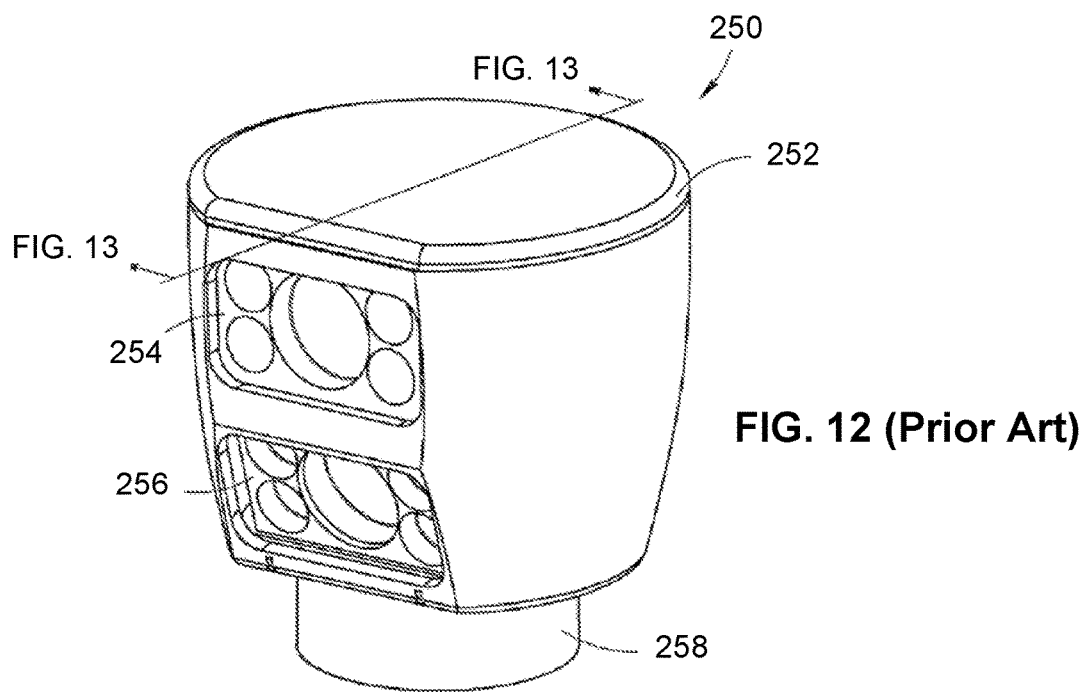
FIG. 12 illustrates a perspective view of a 64 emitter/detector pair LIDAR sensor according to the prior art.
Figure 13:
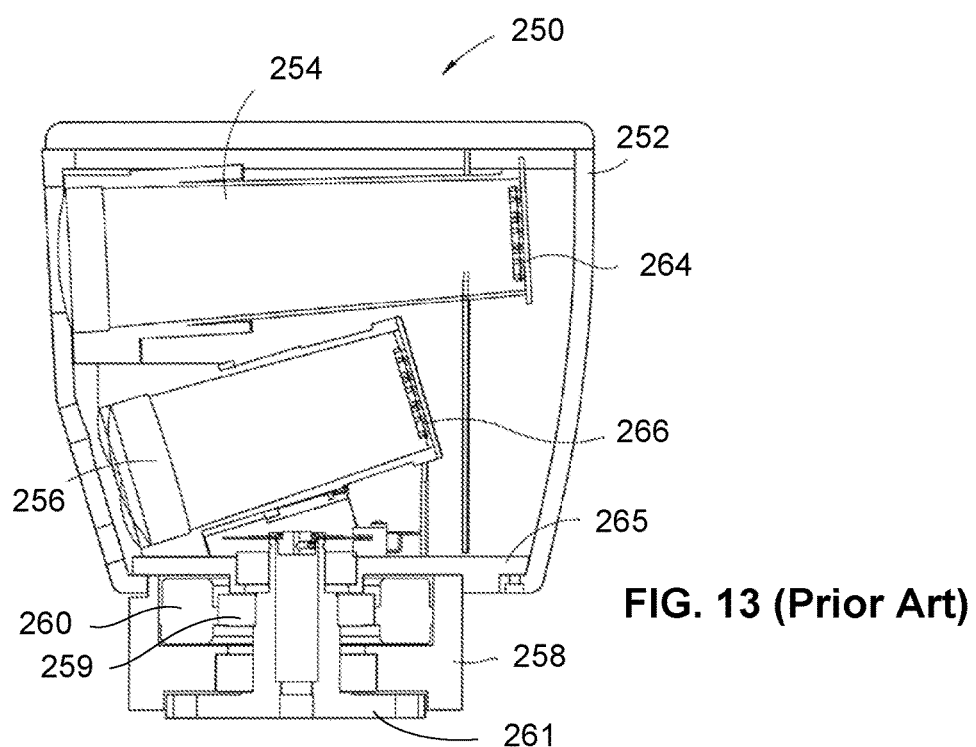
FIG. 13 is a cross-sectional view of the prior art LIDAR sensor illustrated in FIG. 12.
Figure 14:
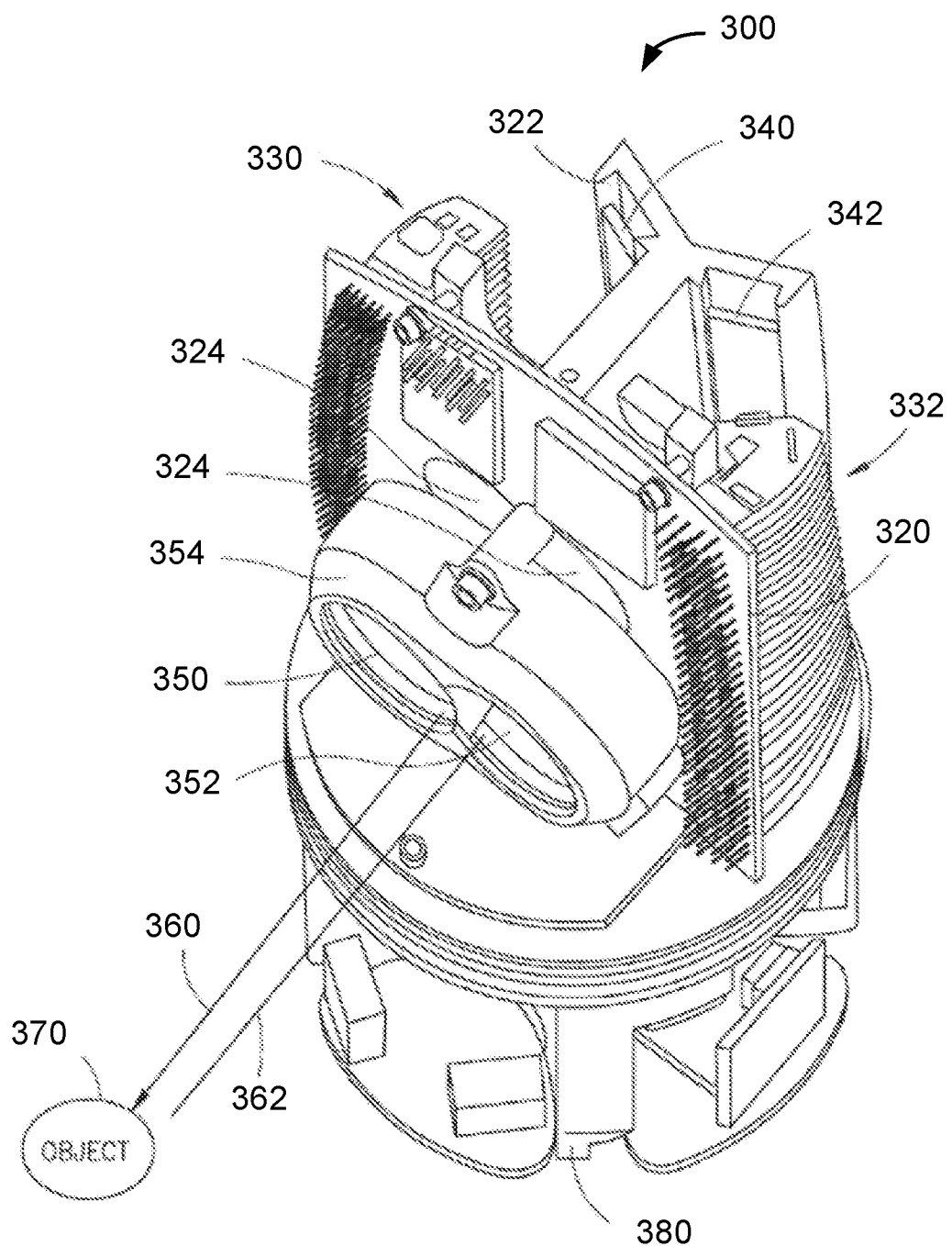
FIG. 14 illustrates a first perspective view of a 32 emitter/detector pair LIDAR sensor according to the prior art.
Figure 15:
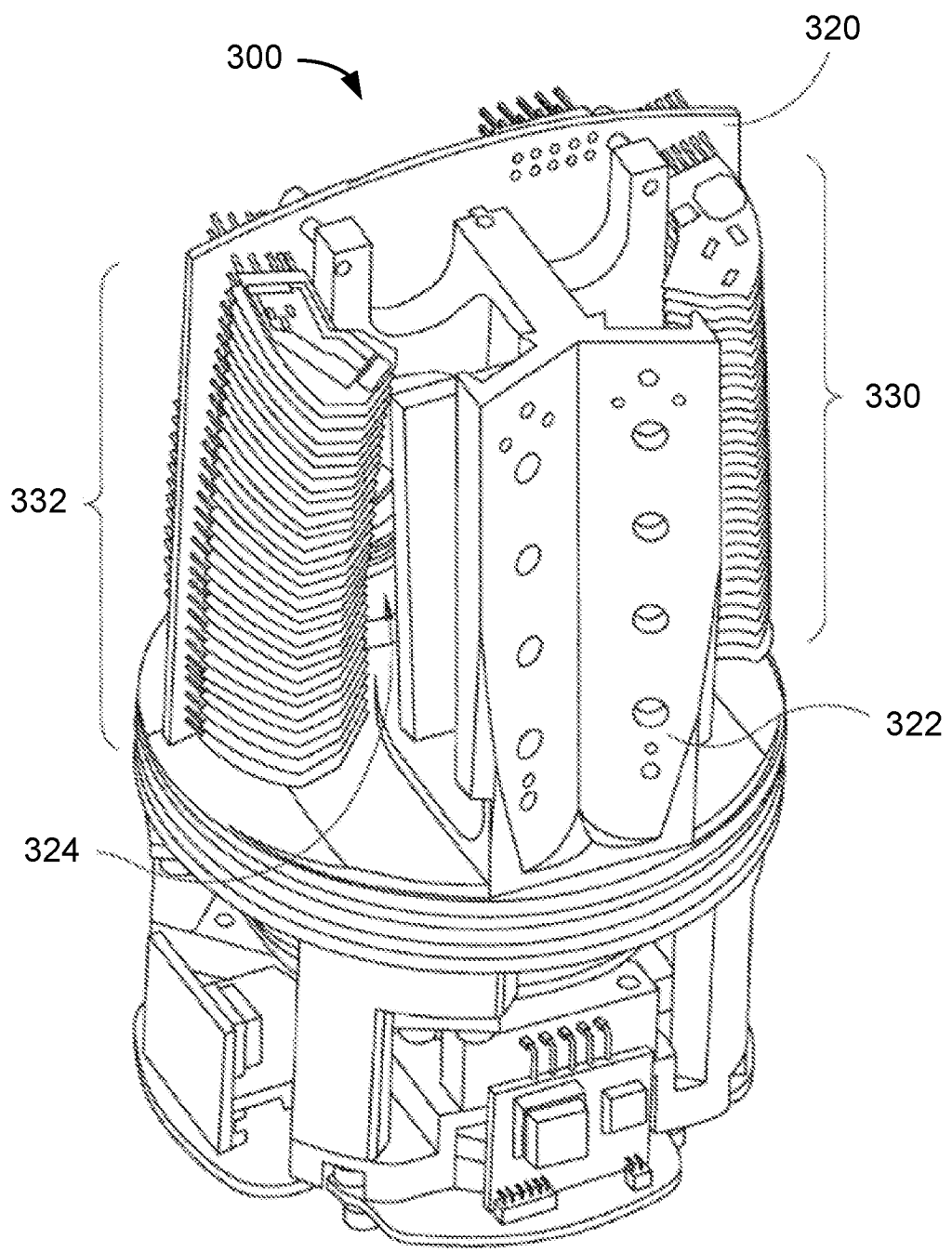
FIG. 15 is a second perspective view of the prior art LIDAR sensor illustrated in FIG. 14.

In one implementation, the bulk imaging optic 130 includes a converging lens, such as a bi-convex lens (shown in FIG. 2) or a plano-convex lens, characterized by a particular focal length at the operating wavelength of the system. The bulk imaging optic 130 can also include multiple discrete lens that cooperate to project light rays toward the aperture layer 140 and that are characterized by a composite focal plane opposite the field, as shown in FIG. 11. However, the bulk imaging optic 130 can be any other suitable type of lens or combination of lenses of any other type or geometry.

1.3 Aperture Layer

Figure 2:
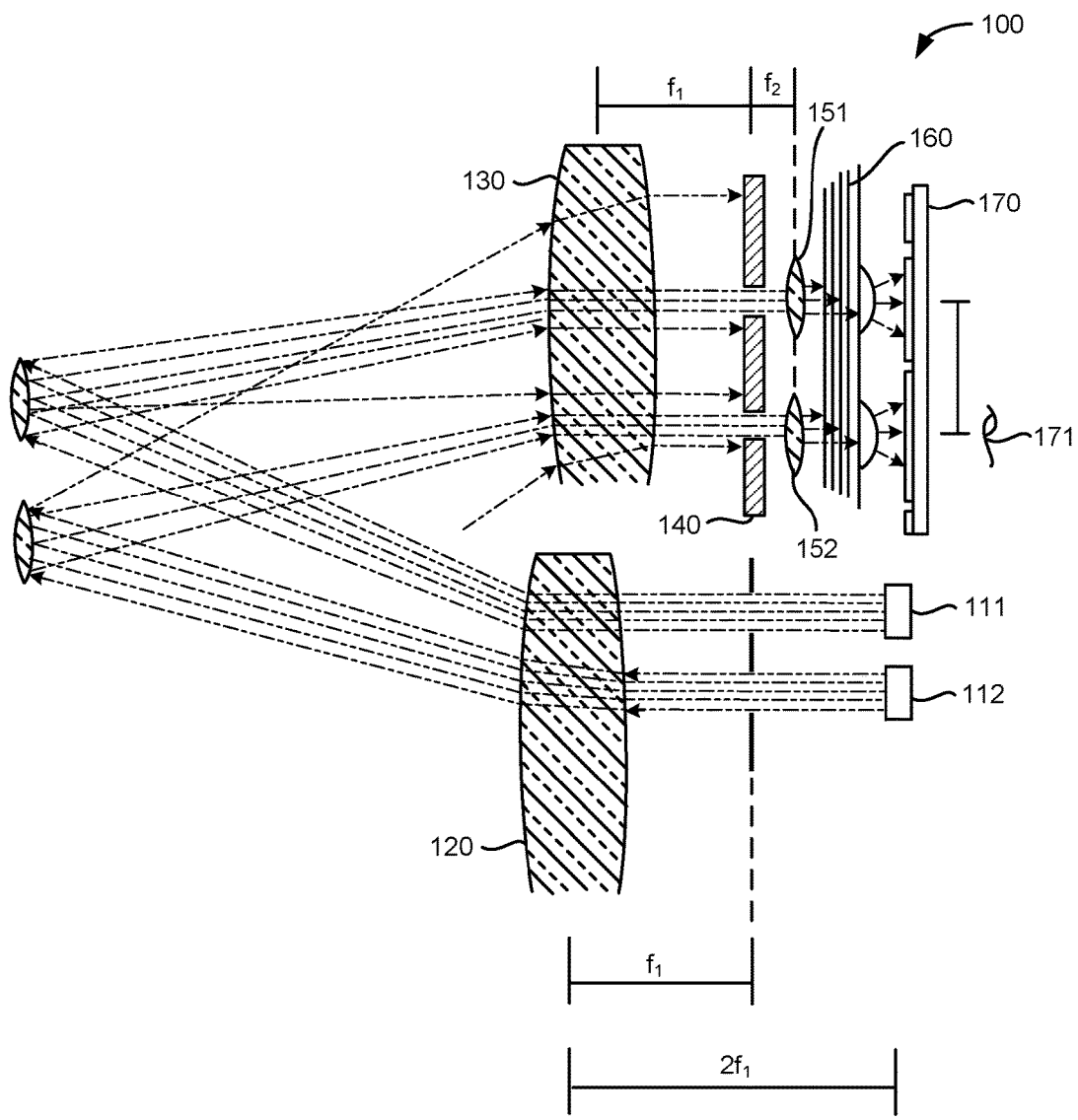
FIG. 2 is a schematic representation in accordance with one variation of the system.
Figure 6:
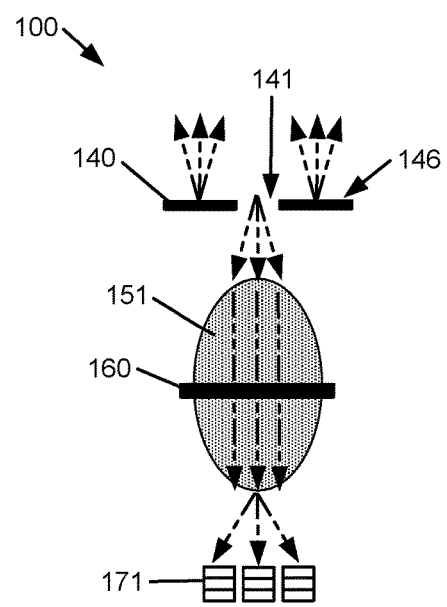
FIG. 6 is a schematic representation in accordance with one variation of the system.

As shown in FIGS. 1 and 2, the system includes an aperture layer 140 coincident the focal plane, defining a set of apertures 144 in a line array parallel to the axes of the illumination sources, and defining a stop region 146 around the set of apertures 144, wherein each aperture in the set of apertures 144 defines a field of view in the field coincident a discrete spot output by a corresponding illumination source in the set of illumination sources 110, and wherein the stop region 146 absorbs and/or reflects light rays reflected from surfaces in the field outside of fields of view defined by the set of apertures 144 and passing through the bulk imaging optic 130. Generally, the aperture layer 140 defines an array of open regions (i.e., apertures, including one aperture per lens) and closed regions ("stop regions") between adjacent opens. Each aperture in the aperture layer 140 defines a "pinhole" that defines a field of view for its corresponding sense channel and passes light rights reflected from an external surface within its field of the view into its corresponding lens, and each stop region 146 can block light rays incident on select regions of the focal plane from passing into the lens array, as shown in FIG. 6.

The aperture layer 140 includes a relatively thin opaque structure coinciding with (e.g., arranged along) the focal plane of the bulk imaging optic 130, as shown in FIGS. 1 and 2. For example, the aperture layer 140 can include a 10 micrometer-thick copper, silver, or nickel film deposited (e.g., plated) over a photocurable transparent polymer and then selectively etched to form the array of apertures. In a similar example, a reflective metalized layer or a light-absorbing photopolymer (e.g., a photopolymer mixed with a light absorbing dye) can be deposited onto a glass wafer and selectively cured with a photomask to form the aperture layer 140 and the set of apertures 144. Alternatively, the aperture layer 140 can include a discrete metallic film that is mechanically or chemically perforated to form the array of apertures, bonded to the lens array, and then installed over the bulk imaging optic 130 along the focal plane. However, the aperture layer 140 can include any other reflective (e.g., mirrored) or light-absorbing material formed in any other way to define the array of apertures along the focal plane of the bulk imaging optic 130.

Figure 3:
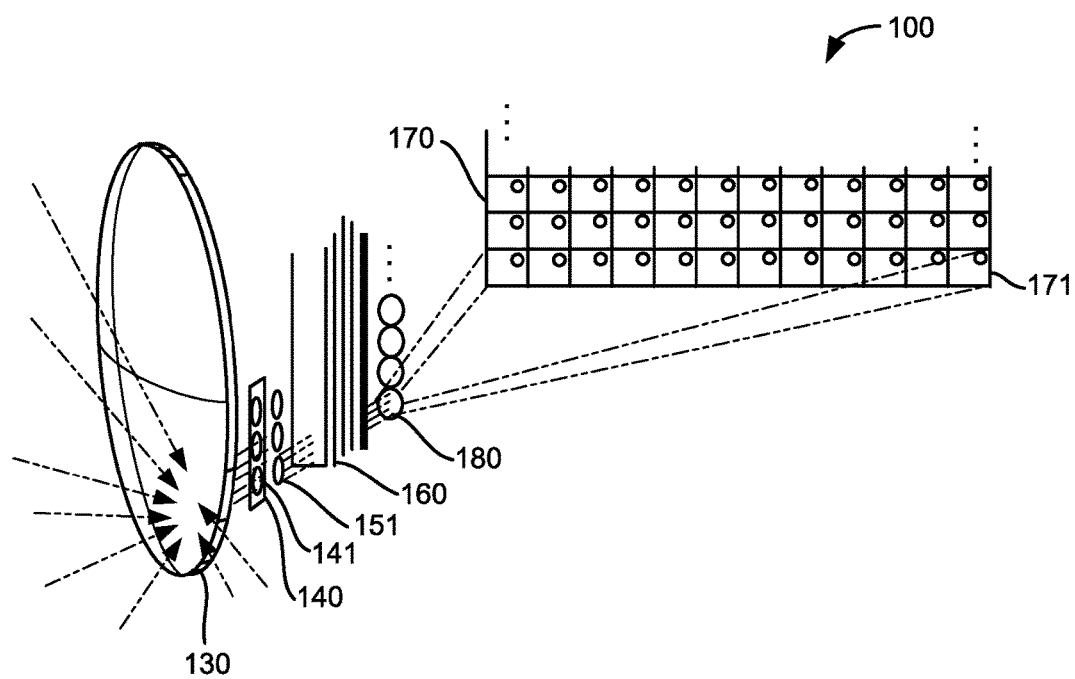
FIG. 3 is a schematic representation in accordance with one variation of the system.

In the one-dimensional optical system 100, the aperture layer 140 can define a single column of multiple discrete circular apertures of substantially uniform diameter, wherein each aperture defines an axis substantially parallel to and aligned with one lens in the lens array, as shown in FIG. 3. Adjacent apertures are offset by an aperture pitch distance greater than the aperture diameter and substantially similar to the lens pitch distance, and the aperture layer 140 defines a stop region 146 (i.e., an opaque or reflecting region) between adjacent apertures such that the apertures define discrete, non-overlapping fields of view for their corresponding sense channels. At increasingly smaller diameters up to a diffraction-limited diameter—which is a function of wavelength of incident light and numeric aperture of the bulk imaging lens—an aperture defines a narrower field of view (i.e., a field of view of smaller diameter) and passes a sharper but lower-intensity (attenuated) signal from the bulk imaging optic 130 into its corresponding lens. The aperture layer 140 can therefore define apertures of diameter: greater than the diffraction-limited diameter for the wavelength of light output by the illumination sources (e.g., 900 nm); substantially greater than the thickness of the aperture layer 140; and less than the aperture pitch distance, which is substantially equivalent to the lens pitch distance and the pixel pitch distance. In one example, aperture layer 140 can define apertures of diameters approaching the diffraction-limited diameter to maximize geometrical selectivity of the field of view of each sense channel. Alternatively, the apertures can be of diameter less that the diffraction-limited diameter for the wavelength of light output by the illumination sources. In one example, the aperture layer 140 can define apertures of diameters matched to a power output of illumination sources in the system and to a number and photon detection capacity of subpixel photodetectors in each pixel in the set of pixels 170 to achieve a target number of photons incident on each pixel within each sampling period. In this example, each aperture can define a particular diameter that achieves target attenuation range for pixels originating from a corresponding illumination source and incident on the bulk imaging optic 130 during a sampling period. In particular, because an aperture in the aperture layer 140 attenuates a signal passed to its corresponding lens and on to its corresponding pixel, the diameter of the aperture can be matched to the dynamic range of its corresponding pixel.

In one implementation, a first aperture 141 in the aperture layer 140 passes light rays—reflected from a discrete region of a surface in the field (the field of view of the sense channel) ahead of the bulk imaging optic 130—into its corresponding lens; a stop region 146 interposed between the first aperture 141 and adjacent apertures in the aperture layer 140 blocks light rays—reflected from a region of the surface outside of the field of view of the first aperture 141—from passing into the lens corresponding to the first aperture 141. In the one-dimensional optical system 100, the aperture layer 140 therefore defines a column of apertures that define multiple discrete, non-overlapping fields of view of substantially infinite depth of field, as shown in FIG. 2.

In this implementation, a first aperture 141 in the aperture layer 140 defines a field of view that is distinct and that does not intersect a field of view defined by another aperture in the aperture layer 140, as shown in FIG. 2. The set of illumination sources 110 includes a first illumination source 111 paired with the first aperture 141 and configured to project an illuminating beam substantially aligned with (i.e., overlapping) the field of view of the first aperture 141 in the field ahead of the bulk imaging optic 130. Furthermore, the first illumination source 111 and a bulk transmitting optic 120 can cooperate to project an illuminating beam of a cross-section substantially similar to (and slightly larger than) the cross section of the field of view of the first aperture 141 as various distances from the bulk imaging optic 130. Therefore light output by the first illumination source 111—paired with the first aperture 141—and projected into the field of view of the first aperture 141 can remain substantially outside the fields of view of other apertures in the aperture layer 140.

Generally, photons projected into the field by the first illumination source 111 illuminate a particular region of a surface (or multiple surfaces) in the field within the field of view of the first sense channel and are reflected (e.g., scattered) by the surface(s); at least some of these photons reflected by the particular region of a surface may reach the bulk imaging optic 130, which directs these photons toward the focal plane. Because these photons were reflected by a region of a surface within the field of view of the first aperture 141, the bulk imaging optic 130 may project these photons into the first aperture 141, and the first aperture 141 may pass these photons into the first lens 151 (or a subset of these photons incident at an angle relative to the axis of the first aperture 141 below a threshold angle). However, because a second aperture 142 in the aperture layer 140 is offset from the first aperture 141 and because the particular region of the surface in the field illuminated via the first illumination source 111 does not (substantially) coincide with the field of view of the second aperture 142, photons reflected by the particular region of the surface and reaching the bulk imaging optic 130 are projected into the second aperture 142 and passed to a second lens 152 behind the second aperture 142, and vice versa, as shown in FIG. 2. Furthermore, a stop region 146 between the first and second apertures 142 can block photons directed toward the focal plane between the first and second apertures 142 reflected by the bulk imaging optic 130, thereby reducing crosstalk between the first and second sense channels.

Figure 4:
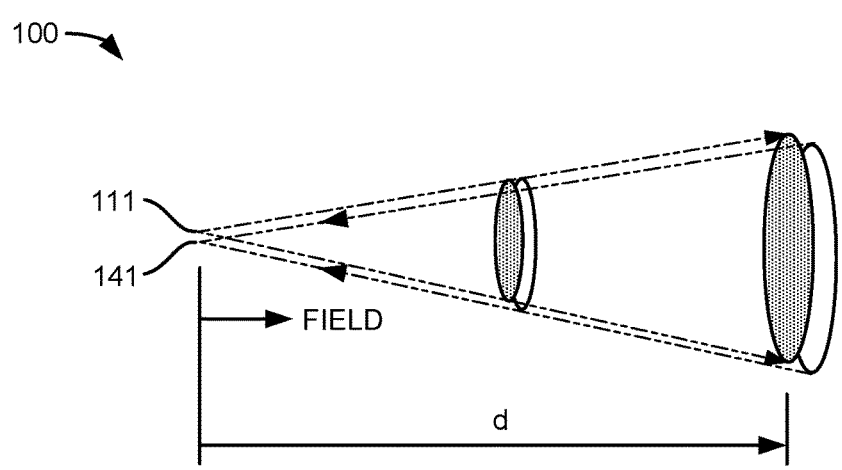
FIG. 4 is a schematic representation in accordance with one variation of the system.

For a first aperture 141 in the aperture layer 140 paired with a first illumination source 111 in the set of illumination sources 110, the first aperture 141 in the aperture layer 140 defines a first field of view and passes—into the first lens 151—incident light rays originating at or reflected from a surface in the field coinciding with the first field of view. Because the first illumination source 111 projects an illuminating beam that is substantially coincident (and substantially the same size as or minimally larger than) the field of view defined by the first aperture 141 (as shown in FIG. 4), a signal passed into the first lens 151 by the first aperture 141 in the aperture layer 140 can exhibit a relatively high ratio of light rays originating from the first illumination source 111 to light rays originating from other illumination sources in the system. Generally, because various illumination sources in the system may output illuminating beams at different frequencies, duty cycles, and/or power levels, etc. at a particular time during operation, light rays passed from the bulk imaging optic 130 into a first pixel 171 in the set of pixels 170 but originating from an illumination source other than the first illumination source 111 paired with the first pixel 171 constitute noise at the first pixel 171. Though the relatively small diameters of apertures in the aperture layer 140 may attenuate a total light signal passed from the bulk imaging optic 130 into the set of lenses 150, each aperture in the aperture layer 140 may pass a relatively high proportion of photons originating from its corresponding illumination source than from other illumination sources in the system; that is, due to the geometry of a particular aperture and its corresponding illumination source, a particular aperture may pass a signal exhibiting a relatively high SNR to its corresponding lens and thus into its corresponding pixel. Furthermore, at smaller aperture diameters in the aperture layer 140—and therefore smaller fields of view of corresponding channels—the system can pass less noise from solar radiation or other ambient light sources to the set of pixels 170.

In one variation, the system includes a second aperture layer interposed between the lens array and the optical filter 160, wherein the second aperture layer defines a second set of apertures 144, each aligned with a corresponding lens in the set of lenses 150, as described above. In this variation, an aperture in the second aperture layer 140 can absorb or reflect errant light rays passed by a corresponding lens, as described above, to further reduce crosstalk between channels, thereby improving SNR within the system. Similarly, the system can additionally or alternatively include a third aperture layer interposed between the optical filter 160 and the diffuser(s) 180, wherein the third aperture layer defines a third set of apertures 144, each aligned with a corresponding lens in the set of lenses 150, as described above. In this variation, an aperture in the third aperture layer can absorb or reflect errant light rays passed by the light filter, as described above, to again reduce crosstalk between channels, thereby improving SNR within the system.

1.4 Lens Array

The system includes a set of lenses 150, wherein each lens in the set of lenses 150 is characterized by a second focal length, is offset from the focal plane opposite the bulk imaging optic 130 by the second focal length, is aligned with a corresponding aperture in the set of apertures 144, and is configured to collimate light rays passed by the corresponding aperture. Generally, a lens in the set of lenses 150 functions to collimate lights rays passed by its corresponding aperture and to pass these collimated light rays into the optical filter 160.

In the one-dimensional optical system 100, the lenses are arranged in a single column, and adjacent lenses are offset by a uniform lens pitch distance (i.e., a center-to-center-distance between adjacent pixels), as shown in FIG. 3. The set of lenses 150 is interposed between the aperture layer and the optical filter 160. In particular, each lens can include a converging lens characterized by a second focal length and can be offset from the focal plane of the bulk imaging optic 130—opposite the bulk imaging optic 130—by the second focal length to preserve the aperture of the bulk imaging optic 130 and to collimate light incident on the bulk imaging optic 130 and passed by a corresponding aperture. Each lens in the set of lens can be characterized by a relatively short focal length (i.e., less than a focal length of the bulk imaging optic 130) and a relatively large marginal ray angle (e.g., a relatively high numeric aperture lens) such that the lens can capture highly-angled light rays projected toward the lens by the extent of the bulk imaging optic 130. That is, each lens in the set of lens can be characterized by a ray cone substantially matched to a ray cone of the bulk imaging optic 130.

Lenses in the set of lenses 150 can be substantially similar. A lens in the set of lenses 150 is configured to collimate light rays focused into its corresponding aperture by the bulk imaging optic 130. For example, a lens in the set of lenses 150 can include a bi-convex or plano-convex lens characterized by a focal length selected based on the size (e.g., diameter) of its corresponding aperture and the operating wavelength of the system. In this example, the focal length (f) of a lens in the set of lenses 150 can be calculated according to the formula:

$$f = \frac{d^2}{2\lambda}$$

where d is the diameter of the corresponding aperture in the aperture layer and $\lambda$ is the operating wavelength of light output by the illumination source (e.g., 900 nm). The geometry of a lens in the set of lenses 150 can therefore be matched to the geometry of a corresponding aperture in the aperture layer such that the lens passes a substantially sharp image of light rays—at or near the operating wavelength—into the optical filter 160 and thus on to the pixel array.

However, the set of lenses 150 can include lenses of any other geometry and arranged in any other way adjacent the aperture layer.

1.5 Optical Filter

As shown in FIG. 3, the system includes an optical filter 160 adjacent the set of lenses 150 opposite the aperture layer and configured to pass light rays at the operating wavelength. Generally, the optical filter 160 receives electromagnetic radiation across a spectrum from the set of lenses 150, passes a relatively narrow band of electromagnetic radiation—including radiation at the operating wavelength—to the pixel array, and blocks electromagnetic radiation outside of the band. In particular, electromagnetic radiation other than electromagnetic radiation output by the illumination source—such as ambient light—incident on a pixel in the set of pixels 170 constitutes noise in the system. The optical filter 160 therefore functions to reject electromagnetic radiation outside of the operating wavelength or, more pragmatically, outside of a narrow wavelength band, thereby reducing noise in the system and increasing SNR.

In one implementation, the optical filter 160 includes an optical bandpass filter that passes a narrow band of electromagnetic radiation substantially centered at the operating wavelength of the system. In one example, the illumination sources output light (predominantly) at an operating wavelength of 900 nm, and the optical filter 160 is configured to pass light between 899.95 nm and 900.05 nm and to block light outside of this band.

The optical filter 160 may selectively pass and reject wavelengths of light as a function of angle of incidence on the optical filter 160. Generally, optical bandpass filters may pass wavelengths of light inversely proportional to their angle of incidence on the light optical bandpass filter. For example, for an optical filter 160 including a 0.5 nm-wide optical bandpass filter, the optical filter 160 may pass over 95% of electromagnetic radiation over a sharp band from 899.75 nm to 900.25 nm and reject approximately 100% of electromagnetic radiation below 899.70 nm and above 900.30 nm for light rays incident on the optical filter 160 at an angle of incidence of approximately 0°. However, in this example, the optical filter 160 may pass over 95% of electromagnetic radiation over a narrow band from 899.5 nm to 900.00 nm and reject approximately 100% of electromagnetic radiation over a much wider band below 899.50 nm and above 900.30 nm for light rays incident on the optical filter 160 at an angle of incidence of approximately 15°. Therefore, the incidence plane of the optical filter 160 can be substantially normal to the axes of the lenses, and the set of lenses 150 can collimate light rays received through a corresponding aperture and output these light rays substantially normal to the incidence plane of the optical filter 160 (i.e., at an angle of incidence of approximately 0° on the optical filter). Specifically, the set of lenses 150 can output light rays toward the optical filter 160 at angles of incidence approximating 0° such that substantially all electromagnetic radiation passed by the optical filter 160 is at or very near the operating wavelength of the system.

In the one-dimensional optical system 100, the system can include a single optical filter 160 that spans the column of lens in the set of lenses 150. Alternatively, the system can include multiple optical filters 160, each adjacent a single lens or a subset of lenses in the set of lenses 150. However, the optical filter 160 can define any other geometry and can function in any other way to pass only a limited band of wavelengths of light.

1.6 Pixel Array and Diffuser

The system includes a set of pixels 170 adjacent the optical filter 160 opposite the set of lenses 150, each pixel in the set of pixels 170 corresponding to a lens in the set of lenses 150 and including a set of subpixels arranged along a second axis non-parallel to the first axis. Generally, the set of pixels 170 are offset from the optical filter 160 opposite the set of lenses 150, and each pixel in the set of pixels 170 functions to output a single signal or stream of signals corresponding to the count of photons incident on the pixel within one or more sampling periods, wherein each sampling period may be picoseconds, nanoseconds, microseconds, or milliseconds in duration.

The system also includes a diffuser 180 interposed between the optical filter 160 and the set of pixels 170 and configured to spread collimated light output from each lens in the set of lenses 150 across a set of subpixels of a single corresponding pixel in the set of pixels 170. Generally, for each lens in the set of lenses 150, the diffuser 180 functions to spread light rays—previously collimated by the lens and passed by the optical filter 160—across the width and height of a sensing area within a corresponding pixel. The diffuser 180 can define a single optic element spanning the set of lenses 150, or the diffuser 180 can include multiple discrete optical elements, such as including one optical diffuser element aligned with each channel in the system.

Figure 5:
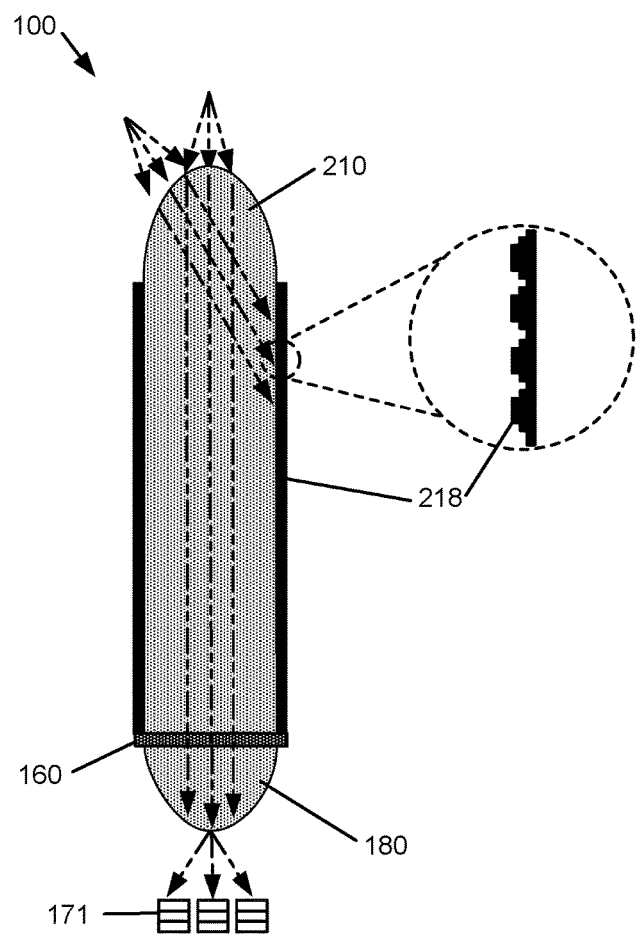
FIG. 5 is a schematic representation in accordance with one variation of the system.

In one implementation, a first pixel 171 in the set of pixels 170 includes an array of single-photon avalanche diode detectors (hereinafter "SPADs"), and the diffuser 180 spreads lights rays—previously passed by a corresponding first aperture 141, collimated by a corresponding first lens 151, and passed by the optical filter 160—across the area of the first pixel 171, as shown in FIGS. 3, 5, and 6. Generally, adjacent apertures can be aligned and offset vertically by an aperture pitch distance, adjacent lenses can be aligned and offset vertically by a lens pitch distance substantially identical to the aperture pitch distance, and adjacent pixels can be aligned and offset vertically by a pixel pitch distance substantially identical to the lens and aperture pitch distances. However, the pixel pitch distance may accommodate only a relatively small number of (e.g., two) vertically-stacked SPADs. Each pixel in the set of pixels 170 can therefore define an aspect ratio greater than 1:1, and the diffuser 180 can spread light rays passed by the optical filter 160 according to the geometry of a corresponding pixel in order to accommodate a larger sensing area per pixel.

In one example, each pixel in the set of pixels 170 is arranged on an image sensor, and a first pixel 171 in the set of pixels 170 includes a single row of 16 SPADs spaced along a lateral axis perpendicular to a vertical axis bisecting the column of apertures and lenses. In this example, the height of a single SPAD in the first pixel 171 can be less than the height (e.g., diameter) of the first lens 151, but the total length of the 16 SPADs can be greater than the width (e.g., diameter) of the first lens 151; the diffuser 180 can therefore converge light rays output from the first lens 151 to a height corresponding to the height of a SPAD at the plane of the first pixel 171 and can diverge light rays output from the first lens 151 to a width corresponding to the width of the 16 SPADs at the plane of the first pixel 171. In this example, the remaining pixels in the set of pixels 170 can include similar rows of SPADs, and the diffuser 180 can similarly converge and diverge light rays passed by corresponding apertures onto corresponding pixels.

In the foregoing example, the aperture layer can include a column of 16 like apertures, the set of lenses 150 can include a column of 16 like lenses arranged behind the aperture layer, and the set of pixels 170 can include a set of 16 like pixels—each including a similar array of SPADs—arranged behind the set of lenses 150. For a 6.4 mm-wide, 6.4 mm-tall image sensor, each pixel can include a single row of 16 SPADs, wherein each SPAD is electrically coupled to a remote analog front-end processing electronics/digital processing electronics circuit 240. Each SPAD can be arranged in a 400 µm-wide, 400 µm-tall SPAD area and can define an active sensing area approaching 400 µm in diameter. Adjacent SPADs can be offset by a SPAD pitch distance of 400 µm. In this example, the aperture pitch distance along the vertical column of apertures, the lens pitch distance along the vertical column of lenses, and the pixel pitch distance along the vertical column of pixels can each be approximately 400 µm accordingly. For the first sense channel in the system (i.e., the first aperture 141, the first lens 151, and the first pixel 171, etc.), a first diffuser 180 can diverge a cylindrical column of light rays passed from the first lens 151 through the optical filter 160—such as a column of light approximately 100 µm in diameter for an aperture layer aspect ratio of 1:4—to a height of approximately 400 µm aligned vertically with the row of SPADs in the first pixel 171. The first diffuser can similarly diverge the cylindrical column of light rays passed from the first lens 151 through the optical filter 160 to a width of approximately 6.4 µm centered horizontally across the row of SPADs in the first pixel 171. Other diffusers 180 in the system can similarly diverge (or converge) collimated light passed by corresponding lenses across corresponding pixels in the set of pixels 170. Therefore, in this example, by connecting each SPAD (or each pixel) to a remote analog front-end processing electronics/digital processing electronics circuit 240 and by incorporating diffusers 180 that spread light passed by the optical filter 160 across the breadths and heights of corresponding pixels, the system can achieve a relatively high sensing area fill factor across the imaging sensor.

Therefore, in the one-dimensional optical system 100, pixels in the set of pixels 170 can include an array of multiple SPADS arranged in aspect ratio exceeding 1:1, and the diffuser 180 can spread light rays across corresponding non-square pixels that enables a relatively large numbers of SPADs to be tiled across a single pixel to achieve a greater dynamic range across the image sensor than an image sensor with a single SPAD per pixel, as shown in FIG. 3. In particular, by incorporating multiple SPADs per pixel (i.e., per sense channel), a first sense channel in the system can detect multiple incident photons—originating from a surface in the field bound by a field of view defined by the first aperture 141—within the span of the dead time characteristic of the SPADs. The first sense channel can therefore detect a "brighter" surface in its field of view. Additionally or alternatively, the first pixel 171 in the first sense channel can be sampled faster than the dead time characteristic of SPADs in the first pixel 171 because, though a first subset of SPADs in the first pixel 171 may be down (or "dead") during a first sampling period due to collection of incident photons during the first sampling period, other SPADs in the first pixel 171 remain on (or "alive") and can therefore collect incident photons during a subsequent sampling period. Furthermore, by incorporating pixels characterized by relatively high aspect ratios of photodetectors, the image sensor can include pixels offset by a relatively small pixel pitch, but the system 100 can still achieve a relatively high dynamic range pixel.

However, pixels in the set of pixels 170 can include any other number of SPADs arranged in any other arrays, such as in a 64-by-1 grid array (as described above), in a 32-by-2 grid array, or in a 16-by-4 grid array, and the diffuser 180 can converge and/or diverge collimated light rays onto corresponding pixels accordingly in any other suitable way. Furthermore, rather than (or in addition to) SPADs, each pixel in the set of pixels 170 can include one or more linear avalanche photodiodes, Geiger mode avalanche photodiodes, photomultipliers, resonant cavity photodiodes, QUANTUM DOT detectors, or other types of photodetectors arranged as described above, and the diffuser(s) 180 can similarly converge and diverge signals passed by the optical filter(s) 160 across corresponding pixels, as described herein.

1.7 Illumination Sources

The system includes a set of illumination sources 110 arranged along a first axis, each illumination source in the set of illumination sources 110 configured to output an illuminating beam of an operating wavelength toward a discrete spot in a field ahead of the illumination source. Generally, each illumination source functions to output an illuminating beam coincident a field of view defined by a corresponding aperture in the set of apertures 144, as shown in FIGS. 1 and 2.

In one implementation, the set of illumination sources 110 includes a bulk transmitter optic and one discrete emitter per sense channel. For example, the set of illumination sources 110 can include a monolithic VCSEL arrays including a set of discrete emitters. In this implementation, the bulk transmitter optic can be substantially identical to the bulk imaging optic 130 in material, geometry (e.g., focal length), thermal isolation, etc., and the bulk transmitter optic is adjacent and offset laterally and/or vertically from the bulk imaging optic 130. In a first example, set of illumination sources 110 includes a laser array including discrete emitters arranged in a column with adjacent emitters offset by an emitter pitch distance substantially identical to the aperture pitch distance. In this first example, each emitter outputs an illuminating beam of diameter substantially identical to or slightly greater than the diameter of a corresponding aperture in the apertures layer, and the column of emitters is arranged along the focal plane of the bulk transmitter optic such that each illuminating beam projected from the bulk transmitter optic into the field intersects and is of substantially the same size and geometry as the field of view of the corresponding sense channel, as shown in FIG. 4. Therefore, substantially all power output by each emitter in the set of illumination sources 110 can be projected into the field of view of its corresponding sense channel with relatively minimal power wasted illuminating surfaces in the field outside of the fields of view of the sense channels.

In a second example, the discrete emitters are similarly arranged in a column with adjacent emitters offset by an emitter pitch distance twice the aperture pitch distance, as shown in FIG. 2. In this second example, each emitter is characterized by an illuminating active area (or aperture) of diameter approximately (or slightly greater than) twice the diameter of a corresponding aperture in the apertures layer, and the column of emitters is offset behind the bulk transmitter optic by twice the focal length of the bulk transmitter optic such that each illuminating beam projected from the bulk transmitter optic into the field intersects and is of substantially the same size and geometry as the field of view of the corresponding sense channel, as described above. Furthermore, for the same illumination beam power density, an illuminating beam output by an emitter in this second example may contain four times the power of an illuminating beam output by an emitter in the first example described above. The system can therefore include a set of emitter arranged according to an emitter pitch distance, configured to output illuminating beams of diameter, and offset behind the bulk transmitter optic by an offset distance as a function of a scale factor (e.g., 2.0 or 3.0) and 1) the aperture pitch distance in the aperture layer, 2) the diameter of apertures in the aperture layer, and 3) the focal length of bulk transmitter optic, respectively. The system can therefore include an illuminating subsystem that is proportionally larger than a corresponding receiver subsystem to achieve greater total output illumination power within the same beam angles and fields of view of corresponding channels in the receiver subsystem.

The system can also include multiple discrete sets of illumination sources, each set of illumination sources 110 paired with a discrete bulk transmitter optic adjacent the bulk imaging optic 130. For example, the system can include a first bulk transmitter optic, a second bulk transmitter optic, and a third bulk transmitter optic patterned radially about the bulk imaging optic 130 at a uniform radial distance from the center of the bulk imaging optic 130 and spaced apart by an angular distance of 120°. In this example, the system can include a laser array with one emitter—as described above—behind each of the first, second, and third bulk transmitter optics. Each discrete laser array and its corresponding bulk transmitter optic can thus project a set of illuminating beams into the fields of view of defined by corresponding in the apertures in the aperture layer. Therefore, in this example, the three discrete laser arrays and the three corresponding bulk transmitter optics can cooperate to project three times the power onto the fields of view of the sense channels in the system, as compared to a single laser array and one bulk transmitter optic. Additionally or alternatively, the system can include multiple discrete layer arrays and bulk transmitter optics to both: 1) achieve a target illumination power output into the field of view of each sensing channel in the receiver subsystem with multiple lower-power emitters per sensing channel; and 2) distribute optical energy over a larger area in the near-field to achieve an optical energy density less than a threshold allowable optical energy density for the human eye.

However, the system can include any other number and configuration of illumination source sets and bulk transmitter optics configured to illuminate fields of view defined by the sense channels. The set of illumination sources 110 can also include any other suitable type of optical transmitter, such as a 1×16 optical splitter powered by a single laser diode, a side-emitting laser diode array, an LED array, or a quantum dot LED array, etc.

1.8 Fabrication

In one implementation, the bulk receiver lens, the aperture layer, the set of lenses 150, the optical filter 160, and the diffuser 180 are fabricated and then aligned with and mounted onto an image sensor. For example, the optical filter 160 can be fabricated by coating a fused silica substrate. Photoactive optical polymer can then be deposited over the optical filter 160, and a lens mold can be placed over the photoactive optical polymer and a UV light source activated to cure the photoactive optical polymer in the form of lenses patterned across the optical filter 160. Standoffs can be similarly molded or formed across the optical filter 160 via photolithography techniques, and an aperture layer defined by a selectively-cured, metallized glass wafer can then be bonded or otherwise mounted to the standoffs to form the aperture layer. The assembly can then be inverted, and a set of discrete diffusers and standoffs can be similarly fabricated across the opposite side of the optical filter 160. A discrete image sensor can then be aligned with and bonded to the standoffs, and a bulk imaging optic 130 can be similarly mounted over the aperture layer.

Alternatively, photolithography and wafer level bonding techniques can be implemented to fabricate the bulk imaging optics, the aperture layer, the set of lenses 150, the optical filter 160, and the diffuser 180 directly on to the un-diced semiconductor wafer containing the detector chips in order to simplify manufacturing, reduce cost, and reduce optical stack height for decreased pixel crosstalk.

2. One-Dimensional Optical System: Lens Tube

One variation of the system includes: a set of illumination sources 110 arranged along a first axis, each illumination source in the set of illumination sources 110 configured to output an illuminating beam of an operating wavelength toward a discrete spot in a field ahead of the illumination source; a bulk imaging optic 130 characterized by a focal plane opposite the field; a set of lens tubes 210 arranged in a line array parallel to the first axis, each lens tube in the set of lens tubes 210 including: a lens characterized by a focal length, offset from the focal plane by the focal length, and configured to collimate light rays reflected into the bulk imaging optic 130 from a discrete spot in the field illuminated by a corresponding illumination source in the set of optics into the bulk imaging optic 130; and a cylindrical wall 218 extending from the lens opposite the focal plane, defining a long axis substantially perpendicular to the first axis, and configured to absorb incident light rays reflected into the bulk imaging optic 130 from a region in the field outside the discrete spot illuminated by the corresponding illumination source. In this variation, the system also includes: an optical filter 160 adjacent the set of lens tubes 210 opposite the focal plane and configured to pass light rays at the operating wavelength; a set of pixels 170 adjacent the optical filter 160 opposite the set of lenses 150, each pixel in the set of pixels 170 corresponding to a lens in the set of lenses 150 and including a set of subpixels aligned along a third axis perpendicular to the first axis; and a diffuser 180 interposed between the optical filter 160 and the set of pixels 170 and configured to spread collimated light output from each lens in the set of lenses 150 across a set of subpixels of a corresponding pixel in the set of pixels 170.

Figure 7:
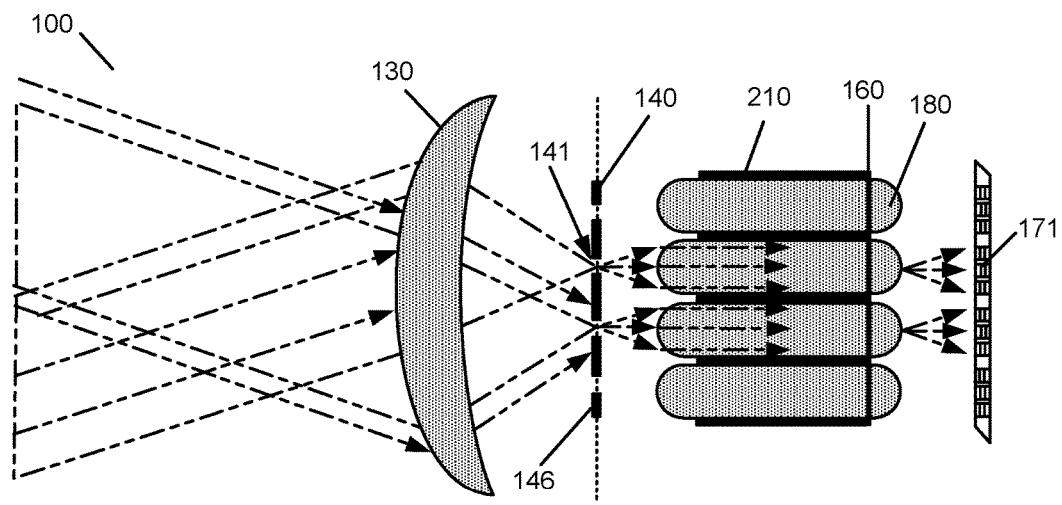
FIG. 7 is a schematic representation in accordance with one variation of the system.

Generally, in this variation, the system includes a lens tube in replacement of (or in addition to) each aperture and lens pair described above. In this variation, each lens tube can be characterized by a second (short) focal length and can be offset from the focal plane of the bulk imaging optic 130 by the second focal length to preserve the aperture of the bulk imaging optic 130 and to collimate incident light received from the bulk imaging optic 130, as described above and as shown in FIGS. 5 and 7.

Each lens tube also defines an opaque cylindrical wall 218 defining an axis normal to the incidence plane of the adjacent optical filter 160 and configured to absorb incident light rays, as shown in FIG. 5. Generally, at greater axial lengths, the cylindrical wall 218 of a lens tube may absorb light rays passing through the lens tube at shallower angles to the axis of the lens tube, thereby reducing the field of view of the lens tube (which may be similar to decreasing the diameter of an aperture in the aperture layer up to the diffraction-limited diameter, as described above) and yielding an output signal of collimated light rays nearer to perpendicular to the incidence plane of the optical filter 160. Each lens tube can therefore define an elongated cylindrical wall 218 of length sufficient to achieve a target field of view and to pass collimated light rays at maximum angles to the axis of the lens tube less than a threshold angle. In this variation, a lens tube can thus function as an aperture-sense pair described above to define a narrow field of view and to output substantially collimated light to the adjacent optical filter 160.

The cylindrical wall 218 of a lens tube can define a coarse or patterned opaque interface about a transparent (or translucent) lens material, as shown in FIG. 5, to increase absorption and decrease reflection of light rays incident on the cylindrical wall 218. Each lens tube (and each lens described above) can also be coated with an anti-reflective coating.

Figure 9:
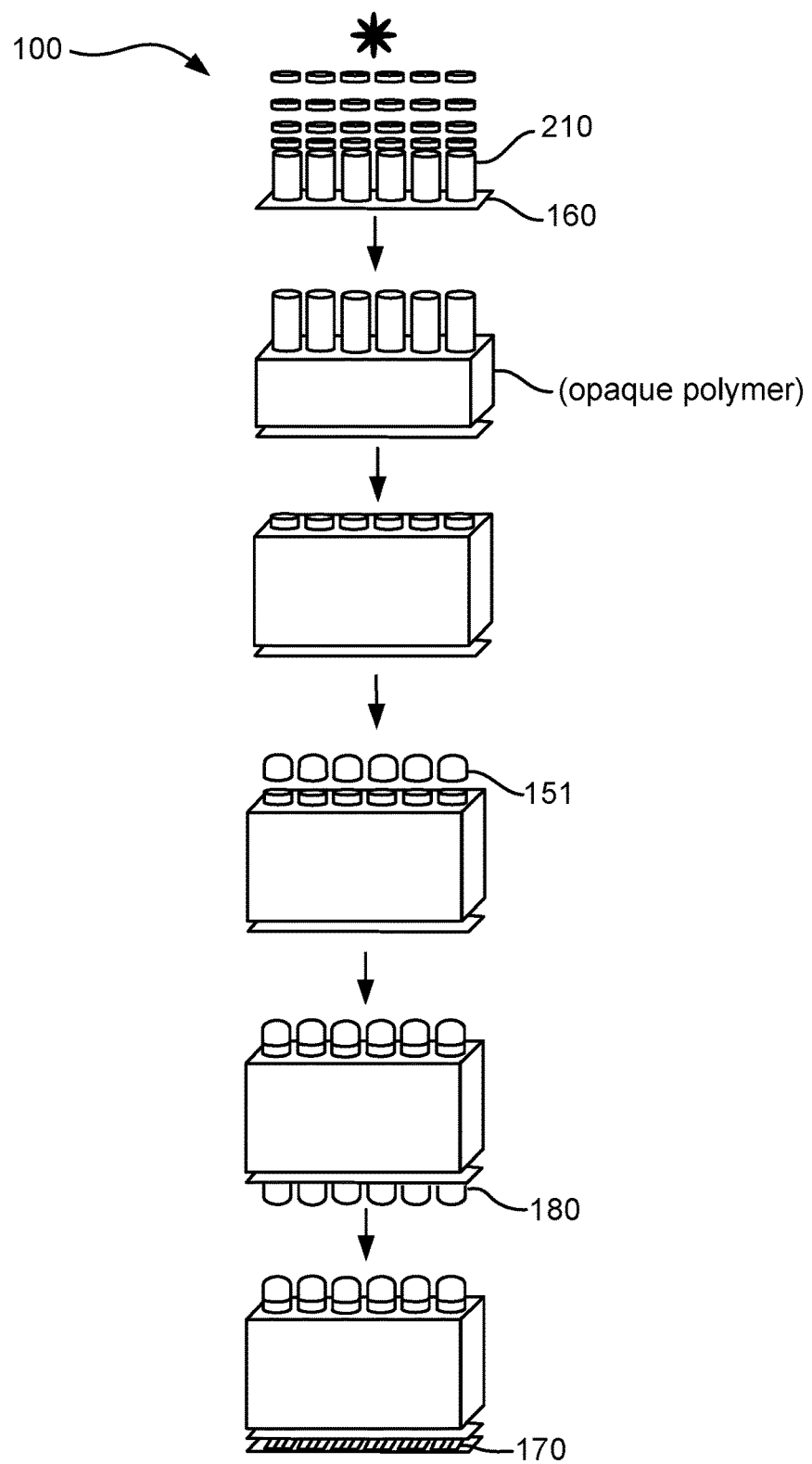
FIG. 9 is a flowchart representation in accordance with one variation of the system.
Figure 10:
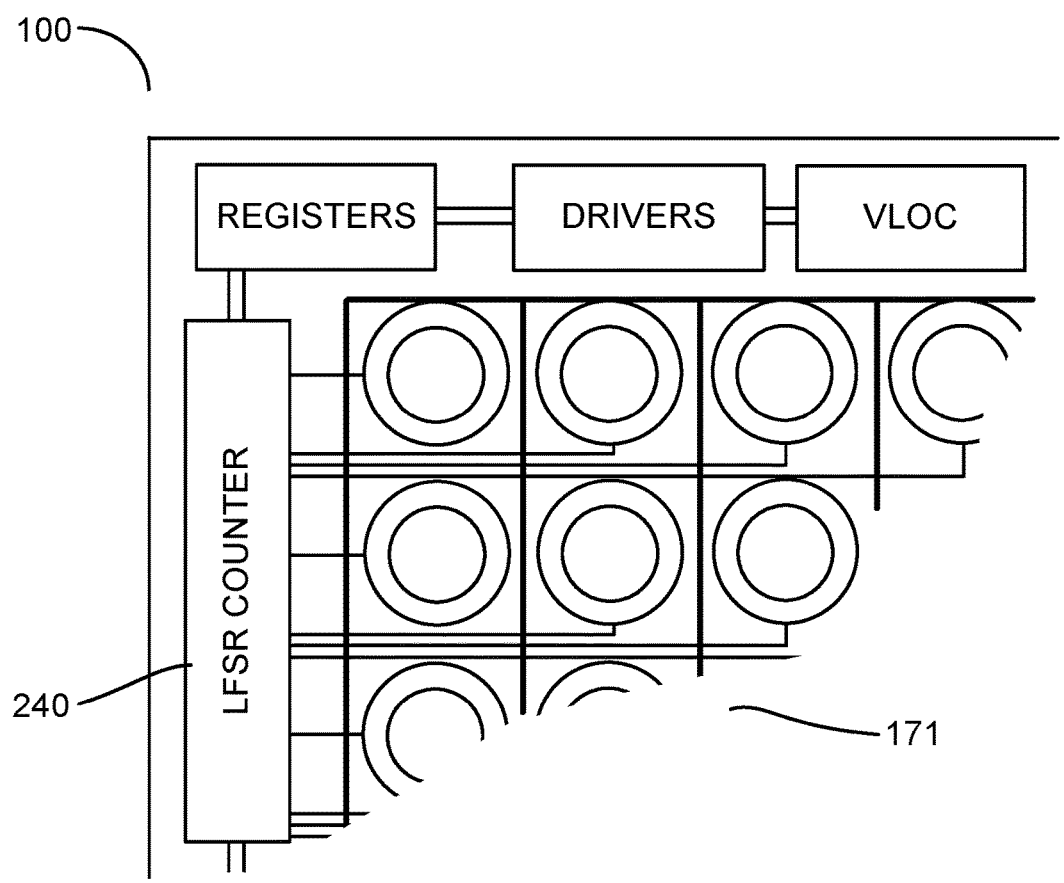
FIG. 10 is a schematic representation in accordance with one variation of the system.

As shown in FIG. 9, in this variation, the set of lens tubes 210 can be fabricated by implementing photolithography techniques to pattern a photoactive optical polymer (e.g., SU8) onto the optical filter 160 (e.g., on a silicon wafer defining the optical filter). A light-absorbing polymer can then be poured between the lens tubes and cured. A set of lenses 150 can then be fabricated (e.g., molded) separately and then bonded over the lens tubes. Alternatively, lenses can be fabricated directly onto the lens tubes by photolithography techniques. Yet alternatively, a mold for lenses can be cast directly onto the lens tubes by injecting polymer into a mold arranged over the lens tubes. A singular diffuser 180 or multiple discrete diffusers 180 can be similarly fabricated and/or assembled on the optical filter 160 opposite the lens tubes. Standoffs extending from the optical filter 160 can be similarly fabricated or installed around the diffuser(s) 180, and the image sensor can be aligned with and bonded to the standoffs opposite the optical filter 160. Other optical elements within the system (e.g., the bulk imaging lens, the bulk transmitting lens, etc.) can be fabricated according to similar techniques and with similar materials.

3. Two-Dimensional Optical System

Another variation of the system includes: a set of illumination sources 110 arranged in a first rectilinear grid array, each illumination source in the set of illumination sources 110 configured to output an illuminating beam of an operating wavelength toward a discrete spot in a field ahead of the illumination source; a bulk imaging optic 130 characterized by a focal plane opposite the field; an aperture layer coincident the focal plane, defining a set of apertures 144 in a second rectilinear grid array proportional to the first rectilinear grid array, and defining a stop region 146 around the set of apertures 144, each aperture in the set of apertures 144 defining a field of view in the field coincident a discrete spot output by a corresponding illumination source in the set of illumination sources 110, the stop region 146 absorbing light rays reflected from surfaces in the field outside of fields of view defined by the set of apertures 144 and passing through the bulk imaging optic 130; a set of lenses 150, each lens in the set of lenses 150 characterized by a second focal length, offset from the focal plane opposite the bulk imaging optic 130 by the second focal length, aligned with an aperture in the set of apertures 144, and configured to collimate light rays passed by the aperture; an optical filter 160 adjacent the set of lenses 150 opposite the aperture layer and configured to pass light rays at the operating wavelength; a set of pixels 170 adjacent the optical filter 160 opposite the set of lenses 150, each pixel in the set of pixels 170 aligned with a subset of lenses in the set of lenses 150; and a diffuser 180 interposed between the optical filter 160 and the set of pixels 170 and configured to spread collimated light output from each lens in the set of lenses 150 across a corresponding pixel in the set of pixels 170.

Generally, in this variation, the system includes a two-dimensional grid array of channels (i.e., aperture, lens, and pixel sets or lens tube and pixel sets) and is configured to image a volume occupied by the system in two dimensions. The system can collect one-dimensional distance data—such as counts of incident photons within a sampling period and/or times between consecutive photons incident on pixels of known position corresponding to known fields of view in the field—across a two-dimensional field. The one-dimensional distance data can then be merged with known positions of the fields of view for each channel in the system to reconstruct a virtual three-dimensional representation of the field ahead of the system.

In this variation, the aperture layer can define a grid array of apertures, the set of lenses 150 can be arranged in a similar grid array with one lens aligned with one aperture in the aperture layer, and the set of pixels 170 can include one pixel per aperture and lens pair, as described above. For example, the aperture layer can define a 24-by-24 grid array of 200-μm-diameter apertures offset vertically and laterally by an aperture pitch distance of 300 μm, and the set of lenses 150 can similarly define a 24-by-24 grid array of lenses offset vertically and laterally by a lens pitch distance of 300 μm. In this example, the set of pixels 170 can include a 24-by-24 grid array of 300-μm-square pixels, wherein each pixel includes a 3×3 square array of nine 100-μm-square SPADs.

Figure 8:
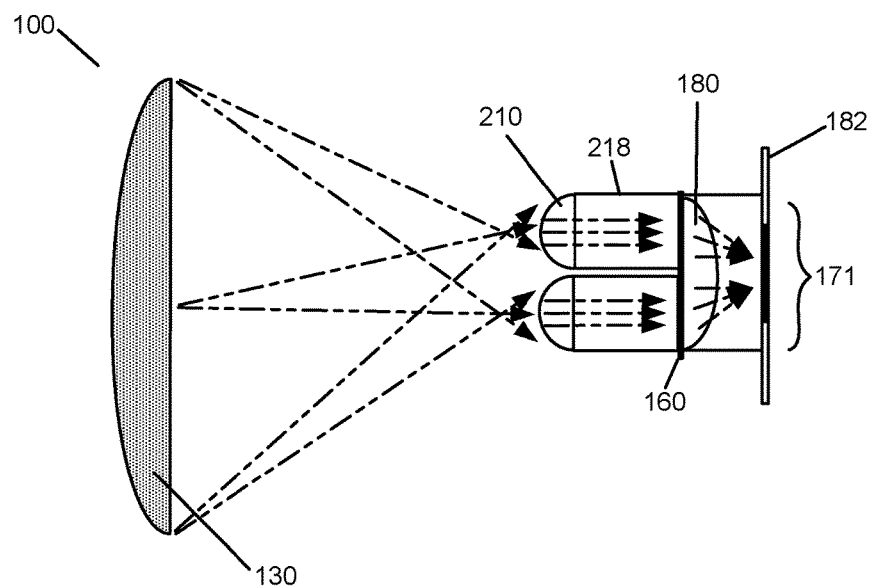
FIG. 8 is a schematic representation in accordance with one variation of the system.

Alternatively, in this variation, the set of pixels 170 can include one pixel per group of multiple aperture and lens pairs. In the foregoing example, the set of pixels 170 can alternatively include a 12-by-12 grid array of 600-μm-square pixels, wherein each pixel includes a 6×6 square array of 36 100-μm-square SPADs and wherein each pixel is aligned with a group of four adjacent lenses in a square grid. In this example, for each group of four adjacent lenses, the diffuser 180: can bias collimated light rays output from a lens in the (1,1) position in the square grid upward and to the right to spread light rays passing through the (1,1) lens across the full breadth and width of the corresponding pixel; can bias collimated light rays output from a lens in the (2,1) position in the square grid upward and to the left to spread light rays passing through the (2,1) lens across the full breadth and width of the corresponding pixel; can bias collimated light rays output from a lens in the (1,2) position in the square grid downward and to the right to spread light rays passing through the (1,2) lens across the full breadth and width of the corresponding pixel; and can bias collimated light rays output from a lens in the (2,2) position in the square grid downward and to the left to spread light rays passing through the (2,2) lens across the full breadth and width of the corresponding pixel, as shown in FIG. 8.

In the foregoing example, for each group of four illumination sources in a square grid and corresponding to one group of four lenses in a square grid, the system can actuate one illumination source in the group of four illumination sources at any given instance in time. In particular, for each group of four illumination sources in a square grid corresponding to one pixel in the set of pixels 170, the system can actuate a first illumination source 111 in a (1,1) position during a first sampling period to illuminate a field of view defined by a first aperture 141 corresponding to a lens in the (1,1) position in the corresponding group of four lenses, and the system can sample all 36 SPADs in the corresponding pixel during the first sampling period. The system can then shut down the first illumination source 111 and actuate a second illumination source 112 in a (1,2) position during a subsequent second sampling period to illuminate a field of view defined by a second aperture 142 corresponding to a lens in the (1,2) position in the corresponding group of four lenses, and the system can sample all 36 SPADs in the corresponding pixel during the second sampling period. Subsequently, the system can then shut down the first and second illumination sources 112 and actuate a third illumination source in a (2,1) position during a subsequent third sampling period to illuminate a field of view defined by a third aperture corresponding to a lens in the (2,1) position in the corresponding group of four lenses, and the system can sample all 36 SPADs in the corresponding pixel during the third sampling period. Finally, the system can shut down the first, second, and third illumination sources and actuate a fourth illumination source in a (2,2) position during a fourth sampling period to illuminate a field of view defined by a fourth aperture corresponding to a lens in the (2,2) position in the corresponding group of four lenses, and the system can sample all 36 SPADs in the corresponding pixel during the fourth sampling period. The system can repeat this process throughout its operation.

Therefore, in the foregoing example, the system can include a set of pixels 170 arranged across an image sensor 7.2 mm in width and 7.2 mm in length and can implement a scanning schema such that each channel in the system can access (can project light rays onto) a number of SPADs otherwise necessitating a substantially larger image sensor (e.g., a 14.4 mm by 14.4 mm image sensor). In particular, the system can implement a serial scanning schema per group of illumination sources to achieve an exponential increase in the dynamic range of each channel in the system. In particular, in this variation, the system can implement the foregoing imaging techniques to increase imaging resolution of the system.

In the foregoing implementation, the system can also include a shutter 182 between each channel and the image sensor, and the system can selectively open and close each shutter 182 when the illumination source for the corresponding channel is actuated and deactivated, respectively. For example, the system can include one independently-operable electrochromic shutter 182 interposed between each lens, and the system can open the electrochromic shutter 182 over the (1,1) lens in the square-gridded group of four lenses and close electrochromic shutters 182 over the (1,2), (2,1), and (2,2) lens when the (1,1) illumination source is activated, thereby rejecting noise passing through the (1,2), (2,1), and (2,2) lens from reaching the corresponding pixel on the image sensor. The system can therefore selectively open and close shutters 182 between each channel and the image sensor to increase SNR per channel during operation. Alternatively, the system can include one independently-operable electrochromic shutter 182 arranged over select regions of each pixel, as shown in FIG. 8, wherein each electrochromic shutter 182 is aligned with a single channel (i.e., with a single lens in the set of lenses). The system can alternatively include MEMS mechanical shutters or any other suitable type of shutter interposed between the set of lenses 150 and the image sensor.

In this variation, the system can define two-dimension grid arrays of apertures, lenses, diffusers, and/or pixels characterized by a first pitch distance along a first (e.g., X) axis and a second pitch distance—different from the first pitch distance—along a second (e.g., Y) axis. For example, the image sensor can include pixels offset by a 25 µm horizontal pitch and a 300 µm vertical pitch, wherein each pixel includes a single row of twelve subpixels.

However, in this variation, the two-dimensional optical system can include an array of any other number and pattern of channels (e.g., apertures, lenses (or lens tubes), and diffusers) and pixels and can execute any other suitable scanning schema to achieve higher spatial resolutions per channel than the raw pixel resolution of the image sensor. The system can additionally or alternatively include a converging optic, a diverging optic, and/or any other suitable type of optical element to spread light rights passed from a channel across the breadth of a corresponding pixel.

As a person skilled in the art will recognize from the previous detailed description and from the figures and claims, modifications and changes can be made to the embodiments of the invention without departing from the scope of this invention as defined in the following claims.

What is claimed is:

1. An optical system for performing distance measurements, the optical system comprising:
   an optical imaging transmit module comprising:
      a plurality of vertical-cavity surface-emitting lasers (VCSELs) arranged in a first array, each VCSEL of the plurality of VCSELs configured to project a discrete spot in a field ahead of the VCSEL and external to the optical imaging transmit module; and
      bulk transmitter optics spaced apart from the plurality of VCSELs and characterized by a focal plane opposite the field; and
   an optical imaging receive module comprising:
      bulk receiver optics configured to receive light rays emitted by the plurality of VCSELs and reflected from surfaces and project the received light rays within the optical imaging receive module;
      an aperture layer spaced apart from the bulk optics and coincident the focal plane, the aperture layer comprising a plurality of apertures corresponding in number to the plurality of lasers and arranged in a second array proportional to the first array;
      a plurality of detectors corresponding in number to the plurality of apertures, each of the plurality of detectors aligned with a corresponding one of the plurality of apertures and including a plurality of single-photon avalanche diodes (SPADs);
      a plurality of collimating lenses corresponding in number to the plurality of apertures, each lens in the plurality of collimating lenses disposed between one of the plurality of apertures and one of the plurality of detectors; and
      an optical filter disposed between the plurality of collimating lenses and the plurality of detectors, the optical filter configured to receive light from the plurality of collimating lenses and pass light at the operating wavelength to the plurality of detectors.

2. The optical system of claim 1 wherein the optical imaging transmit module and the optical imaging receive module are disposed adjacent to each other.

3. The optical system of claim 2 wherein system is configured to be rotated about an axis parallel to a column of apertures in the plurality of apertures.

4. The optical system of claim 3 wherein the bulk transmitter optics and bulk receiver optics are substantially identical to each other in material, geometry and thermal isolation and are disposed adjacent to, and offset laterally from, each other.

5. The optical system of claim 1 wherein the optical imaging receive module includes a plurality of channels, corresponding in number to the plurality of detectors and arranged in an array, wherein each channel in the plurality of channels includes one aperture from the plurality of apertures, one collimating lens from the plurality of collimating lenses and one detector from the plurality of detectors.

6. The optical system of claim 1 wherein the plurality of SPADs included in each of the plurality of detectors is arranged in an array.

7. The optical system of claim 6 wherein the plurality of SPADs included in each of the plurality of detectors is arranged in two-dimensional array.

8. The optical system of claim 7 wherein each of the plurality of VCSELs and the plurality of SPADs are arranged in two-dimensional arrays.

9. The optical system of claim 1 wherein the bulk optics are configured to project the received light rays within the optical imaging receive module towards a focal plane and wherein each lens in the plurality of collimating lenses is characterized by a focal length and spaced apart from the focal plane by the focal length.

10. The optical system of claim 9 wherein the aperture layer is coincident to the focal plane and comprises a stop region around the plurality of apertures.

11. The optical system of claim 10 wherein the stop region is configured to absorb light rays reflected from surfaces.

12. An optical system for performing distance measurements, the optical system comprising:
   an optical imaging transmit module comprising:
      bulk transmitter optics; and
      a plurality of lasers arranged in a first array spaced apart from the bulk transmitter optics, each of the plurality of lasers configured to project a discrete illuminating beam at an operating wavelength through the bulk transmitter optics; and
   an optical imaging receive module comprising:
      bulk receiver optics configured to receive light rays emitted by the plurality of lasers and reflected from surfaces and project the received light rays within the optical imaging receive module;
      an aperture layer spaced apart from the bulk optics and comprising a plurality of apertures corresponding in number to the plurality of lasers and arranged in a second array proportional to the first array;
      a plurality of detectors corresponding in number to the plurality of apertures, each of the plurality of detectors aligned with a corresponding one of the plurality of apertures;
      a plurality of lenses corresponding in number to the plurality of apertures, each lens in the plurality of lenses disposed between one of the plurality of apertures and one of the plurality of detectors; and
      an optical filter disposed between the plurality of lenses and the plurality of detectors, the optical filter configured to receive light from the plurality of lenses and pass light at the operating wavelength to the plurality of detectors.

13. The optical system of claim 12 wherein the optical imaging receive module includes a plurality of channels, corresponding in number to the plurality of detectors and arranged in an array, wherein each channel in the plurality of channels includes one aperture from the plurality of apertures, one collimating lens from the plurality of lenses and one detector from the plurality of detectors.

14. The optical system of claim 13 wherein each of the detectors in the plurality of detectors comprises a plurality of single-photon avalanche diodes (SPADs).

15. The optical system of claim 14 wherein each of the lasers in the plurality of lasers comprises a vertical-cavity surface-emitting laser (VCSEL).

16. The optical system of claim 14 wherein the optical image receive module further comprises a diffuser interposed between the optical filter and the plurality of detectors, the diffuser configured to spread collimated light output from each lens in the plurality of lenses across a width and height of a sensing area of SPADs in the same channel as the lens.

17. The optical system of claim 12 wherein system is configured to be rotated about an axis parallel to a column of apertures in the plurality of apertures.

18. The optical system of claim 12 wherein the bulk optics are configured to project the received light rays within the optical imaging receive module towards a focal plane and wherein each lens in the plurality of lenses is characterized by a focal length and spaced apart from the focal plane by the focal length.

19. The optical system of claim 18 wherein the aperture layer is coincident to the focal plane and comprises a stop region around the plurality of apertures and wherein the stop region is configured to absorb light rays reflected from surfaces.

20. The optical system of claim 12 wherein each lens in the plurality of lenses is configured to collimate light rays passed by its corresponding aperture in the plurality of apertures and to pass the collimated light rays into the optical filter.

* * * * *